US006973015B1

(12) United States Patent
Murakami et al.

(10) Patent No.: US 6,973,015 B1
(45) Date of Patent: Dec. 6, 2005

(54) OPTICAL DISK, METHOD FOR RECORDING AND REPRODUCING ADDITIONAL INFORMATION TO AND FROM OPTICAL DISK, REPRODUCING APPARATUS FOR OPTICAL DISK, AND RECORDING AND REPRODUCING APPARATUS FOR OPTICAL DISK

(75) Inventors: Motoyoshi Murakami, Hirakata (JP); Mitsuaki Oshima, Kyoto (JP); Norio Miyatake, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/400,986

(22) Filed: Sep. 22, 1999

(30) Foreign Application Priority Data

Sep. 22, 1998 (JP) ................................. 10-267891

(51) Int. Cl.⁷ ............................................... G11B 7/00
(52) U.S. Cl. ............................... 369/47.21; 369/47.22; 369/53.21; 369/84; 713/193
(58) Field of Search .................... 705/57–59; 713/176, 713/193; 380/250, 200–242; 369/275.3, 369/47.21, 53.21, 84, 47.22

(56) References Cited

U.S. PATENT DOCUMENTS

| 5,089,358 | A | * | 2/1992 | Taki et al. ................... 428/694 |
| 5,265,082 | A | * | 11/1993 | Gneiwek et al. | |
| 5,708,650 | A | * | 1/1998 | Nakashima et al. ..... 369/275.3 |
| 5,764,607 | A | * | 6/1998 | Maeda et al. .................. 368/47 |
| 5,802,174 | A | * | 9/1998 | Sako et al. ...................... 380/4 |
| 5,807,640 | A | * | 9/1998 | Ueno et al. ................ 428/64.1 |
| 6,618,335 | B2 | * | 9/2003 | Tanaka et al. ........... 369/53.21 |

FOREIGN PATENT DOCUMENTS

| EP | 0 766 468 | 4/1997 |
| EP | 0 802 527 | 10/1997 |
| EP | 0 807 929 | 11/1997 |
| JP | 6-150317 | 5/1994 |
| JP | 7-272325 | 10/1995 |
| JP | 9-245385 | 9/1997 |

OTHER PUBLICATIONS

Patent Abstracts of Japan, vol. 1997, No. .10, Oct. 31, 1997, & JP 09 171619 A (Sony Corp), Jun. 30, 1997, Abstract.
Database WPI, Derwent Publications Ltd., London, GB; AN 1998-363034, XP002164565, & WO 98 27553 A (Matsushita Electric Ind. Co. Ltd.), Jun. 25, 1998, Abstract.

* cited by examiner

*Primary Examiner*—Gregory Morse
*Assistant Examiner*—Tongoc Tran
(74) *Attorney, Agent, or Firm*—Wenderoth, Lind & Ponack, L.L.P.

(57) ABSTRACT

An optical disk comprises a first recording area for recording contents data and data for recording and reproducing the contents data, and a second recording area for recording secondary data on the contents recorded in the first recording area, the secondary data being recorded as stripe marks longer in radial direction. Further, the second recording area comprises a first section for recording control data on the second recording area, a second section for recording data not to be inhibited to be outputted from a recording and reproducing apparatus for the optical disk, and a third section for recording data to be inhibited to be outputted from a recording and reproducing apparatus. The control data recorded in the first section includes an identifier which shows whether said second recording area includes said third section or not. By using the data to be inhibited to be outputted in the second recording area, a copyright of contents is protected and illegal use of software is prevented.

52 Claims, 26 Drawing Sheets

WAVEFORM OF DIFFERENCE SIGNAL OF BCA WAVEFORM
FOR RECORDING CURRENT OF 8A

WAVEFORM OF SUM SIGNAL OF BCA WAVEFORM
FOR RECORDING CURRENT OF 8A

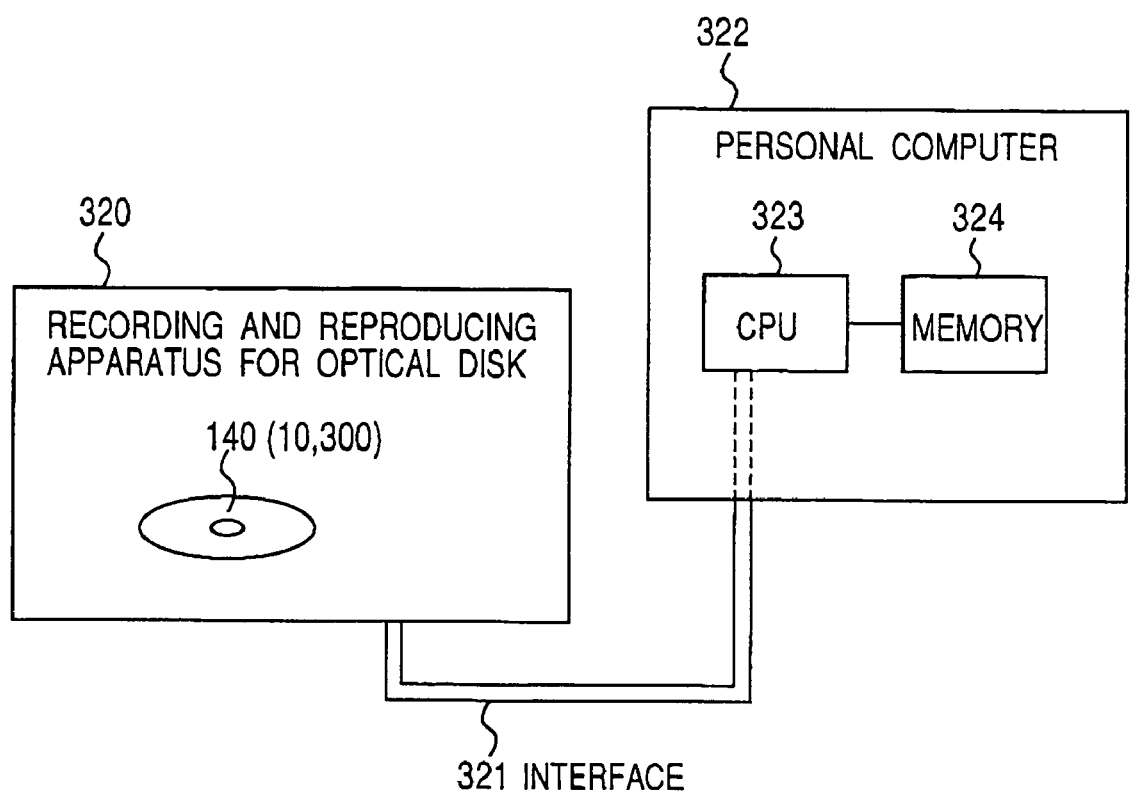

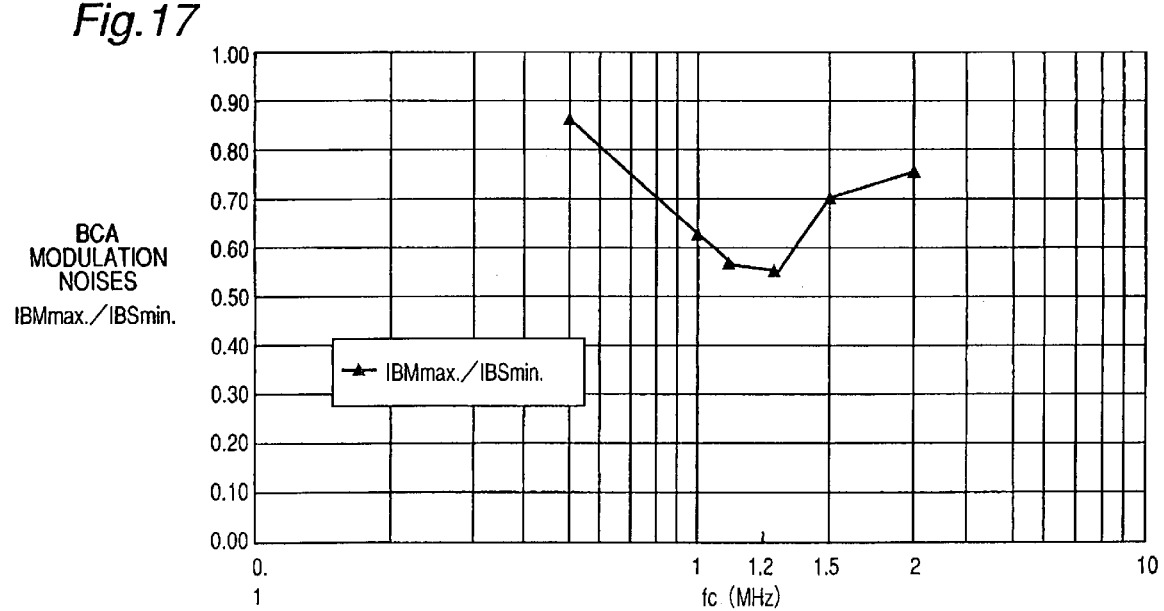

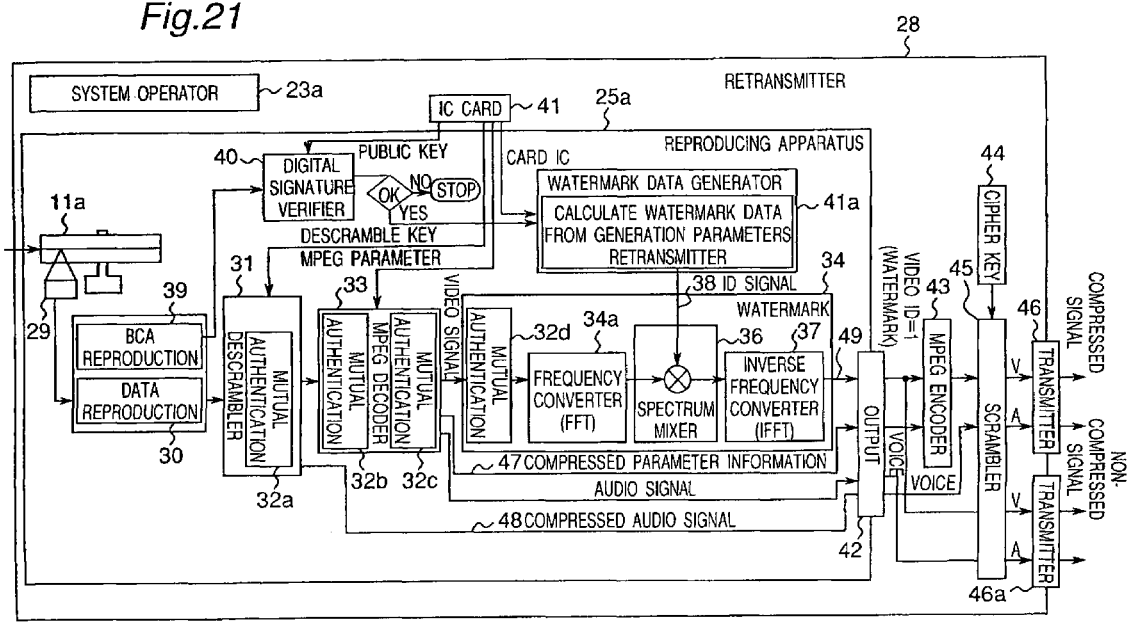

ORIGINAL SIGNAL

SPECTRUM OF
ORIGINAL SIGNAL

SPECTRUM OF
ID SIGNAL

SIGNAL AFTER
SPECTRUM SPREADING

SIGNAL AFTER INVERSE
FREQUENCY CONVERSION

SIGNAL OF ILLEGAL COPY

FREQUENCY SPECTRUM
OF ILLEGAL COPY

FREQUENCY SPECTRUM
OF ILLEGAL COPY−SPECTRUM
OF ID SIGNAL

OPTICAL DISK, METHOD FOR RECORDING AND REPRODUCING ADDITIONAL INFORMATION TO AND FROM OPTICAL DISK, REPRODUCING APPARATUS FOR OPTICAL DISK, AND RECORDING AND REPRODUCING APPARATUS FOR OPTICAL DISK

BACKGROUND OF THE INVENTION

1. Field of the Invention

The present invention relates to an optical information recording medium such as an optical disk on which information can be recorded, reproduced or erased, a recording and reproducing method and a recording and reproducing apparatus therefor.

2. Description of Prior Art

Recently, as electronic computers and image processing systems are developed, an amount of information data to be processed and image processing speed are increased rapidly, and audio and visual data are digitalized. Then, an auxiliary storage device, which is not expensive, has a large capacity and can be accessed at a high speed, and a recording medium therefor, especially an optical disk, has rapidly become popular.

A basic structure of a prior art magneto-optical disk, as an example of an optical disk, is as follows. A recording layer is formed via a dielectric layer on a disk substrate. Further, an intermediate dielectric layer and a reflection layer are formed on the recording layer successively, and an overcoat layer is formed thereon. Recording and erasing of information are performed with illumination of a laser beam to increase the temperature of the recording layer so as to change its magnetization, while reproduction of recorded signals is performed with illumination of a laser beam onto the recording layer by detecting rotation in polarization plane as a change in optical intensity due to the magneto-optical effect.

For optical disks such as DVD-ROM, DVD-RAM and DVD-R, information is formed as uneven pits on a substrate or two optically different states of the recording layer made of a phase-change material or an organic material. Further, a reflection layer and an overcoat layer are formed thereon. Then, a reproduction signal is detected as a difference between two states in the intensity of reflecting light due to the existence of a pit or due to structural or chemical changes when the disk is illuminated with a laser beam.

For an optical disk, protection management of disk information is required to use additional information which can be used for copyright protection such as prohibition of copy or prevention of illegal use of a software. In the above-mentioned optical disks, it is possible to record disk information in the TOC (table of contents) area or the like which is a recording area for control data. However, when the disk information is recorded with prepits, it is managed for each stamper. Therefore it is a problem that the disk information cannot be managed for each user.

Further, when information is recorded with a magnetic film or a thin film made of a phase change material, the additional information can be easily illegally changed or rewritten. Therefore protection management for copyright of the contents in an optical disk or the like is not possible.

Further, when additional information is recorded with an irreversible recording technique, if it can be reproduced and outputted from the recording and reproducing apparatus, the additional information can be interpolated or processed. Therefore the management of main information becomes insufficient and that an illegal work may not be prevented.

SUMMARY OF THE INVENTION

An object of the present invention is to provide an optical disk which can be used for copyright protection such as inhibition of copy or prevention of illegal use of a software.

Another object of the present invention is to provide a recording and reproduction method which can be used for copyright protection for an optical disk.

A further object of the present invention is to provide a reproducing apparatus, a recording apparatus and a recording and reproducing apparatus which can be used for copyright protection for the optical disk.

In one aspect of the invention, an optical disk according to the invention has a recording layer for recording information, and the recording layer disk comprises a first recording area for recording contents data and data for recording and reproducing the contents data, and a second recording area for recording secondary data on the contents recorded in the first recording area, the secondary data being recorded as stripe marks longer in radial direction. The second recording area comprises a first section for recording control data on the second recording area, a second section for recording data not to be inhibited to be outputted from a recording and reproducing apparatus for the optical disk, and a third section for recording data to be inhibited to be outputted from the recording and reproducing apparatus for the optical disk. Further, the control data recorded in the first section includes an identifier which shows whether the second recording area includes the third section or not. The data recorded in the second recording area are recorded, for example, as a plurality of data arrays arranged in the circumferential direction of the optical disk. According to the optical disk, the secondary data can be used for copyright protection such as prevention of illegal copy and of illegal use of software.

In a second aspect of the invention, a method reproducing contents from the above-mentioned disk comprises the steps of reproducing data from the second recording area before reproducing data from the first recording area, deciding, based on control data included in data reproduced from the second recording area, whether the data reproduced from the second recording area include data to be inhibited to be outputted from a recording and reproducing apparatus for the optical disk to the external, and processing the data to be inhibited to be outputted only in the a recording and reproducing apparatus when the data reproduced from the second recording area are determined to include the data to be inhibited to be outputted, without outputting the data to be inhibited to be outputted.

In a third aspect of the invention, an apparatus for reproducing contents from the above-mentioned optical disk comprises an optical head which reproduces information from the optical disk with an optical spot, a first reproducing section which reproduces data with the optical head from the first recording area, and a second reproducing section which reproduces data with the optical head from the second recording area. When data to be inhibited to be outputted are recorded in the second recording area, the second reproducing section processes the data only therein.

In a fourth aspect of the invention, an apparatus for reproducing contents from the above-mentioned optical disk comprises an optical head which reproduces information from the optical disk with an optical spot, a first reproducing section which reproduces data with the optical head from the first recording area, and a second reproducing section which reproduces data with the optical head from the second recording area. When the second reproducing section generates information signals based on data to be inhibited to be outputted recorded in the second recording area, and the first reproducing section superposes the information signals to signals reproduced from the first recording area and outputs the superposed signals.

In a fifth aspect of the invention, a recording and reproducing apparatus for recording contents from the above-mentioned optical disk comprises a generator which generates information signals based on data inherent to the optical disk, recorded in the second recording area and inhibited to be outputted from the recording apparatus, and a recorder which superposes the generated information signals with predetermined signals and records the superposed signals to the first recording area or add them to the second recording area.

In a sixth aspect of the invention, a recording apparatus for recording contents to the above-mentioned optical disk comprises a cipher device which ciphers the contents based on data including information inherent to a disk, the information having been recorded in the second recording area, and a recording section which records the contents ciphered by the cipher device in the first recording area in the optical disk.

In a seventh aspect of the invention, a reproducing apparatus for reproducing contents from the above-mentioned optical disk comprises an optical head which reproduces information from the optical disk with an optical spot, a first reproducing section which reproduces data with the optical head from the first recording area, and a second reproducing section which reproduces data with the optical head from the second recording area. The the first reproducing section decodes the ciphered contents data by using the disk identification reproduced by the second reproducing section.

In an eighth aspect of the invention, a reproducing apparatus for reproducing contents from the above-mentioned optical disk having the secondary data including a disk identification inherent to each optical disk comprises an optical head which reproduces information from the optical disk with an optical spot, a first reproducing section which reproduces data with the optical head from the first recording area, and a second reproducing section which reproduces data with the optical head from the second recording area. The second reproducing section comprises a device which suppresses high frequency components with cut-off frequency of 1.2 MHz PE-RZ decoder and decodes the secondary data after suppressing high frequency components by the device.

An advantage of the present invention is that by using additional data recorded in the second recording area in an optical disk, contents recorded in the first recording area can be protected strongly.

BRIEF DESCRIPTION OF THE DRAWINGS

These and other objects and features of the present invention will become clear from the following description taken in conjunction with the preferred embodiments thereof with reference to the accompanying drawings, and in which:

FIG. 11 is a diagram of a system including an optical disk drive and a personal computer;

FIG. 17 is a graph of BCA modulation noises plotted against cut-off frequency of a low-pass filter.

FIG. 21 is a block diagram of an entire re-transmission apparatus and a reproducing apparatus of a system operator;

DETAILED DESCRIPTION OF THE PREFERRED EMBODIMENTS

Figure 1A:
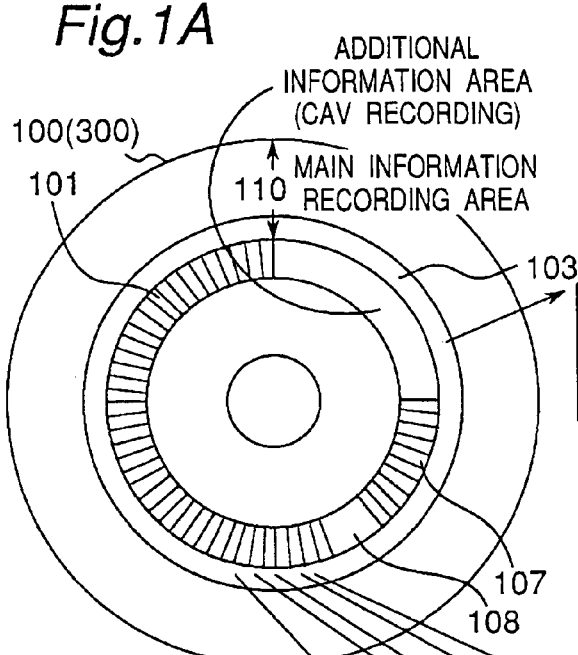
FIGS. 1A, 1B and 1C are a plan view of an optical disk of an embodiment of the invention, a diagram of control data and a diagram of waveforms of signals on recording and on reproduction, respectively.

Referring now to the drawings, wherein like reference characters designate like or corresponding parts throughout the several views, the invention will be explained below in detail with reference to embodiments. First, a structure of an optical disk according to an embodiment of the present invention will be explained. FIG. 1A is a plan view of the optical disk. The optical disk 100 includes a main information area for recording main information 110 and an additional information area for recording additional information 101. The main information area has a lead-in area and a TOC area (not shown) as in prior art optical disks. When data are recorded or reproduced, the lead-in area is focused on, and after the reproduction becomes possible, the control data (TOC) 103 of the main information are reproduced from the TOC area. The control data are formed, for example, as pit signals. The additional information area is located at a predetermined area in the inner peripheral portion of the optical disk, but it may be located at a predetermined area in the outer peripheral portion thereof. The additional information is formed as marks of stripes longer in the radial direction (similar to a bar code) and visible for the naked eye. The main information is data (contents) recorded or reproduced by a user, for example, compressed video signal of a moving picture. The additional data are not directly necessary for recording or reproducing the main information, and the main information can be recorded or reproduced even when the additional information is not recorded. The additional information is data such as a serial number which is recorded when the optical disk is fabricated, and it can include management information which can be used for copyright protection such as prohibition of copy or prevention of illegal use of a software. As will be explained later, a part of the additional information may have data to be inhibited to be outputted from a recording and reproducing apparatus.

Figure 1B:
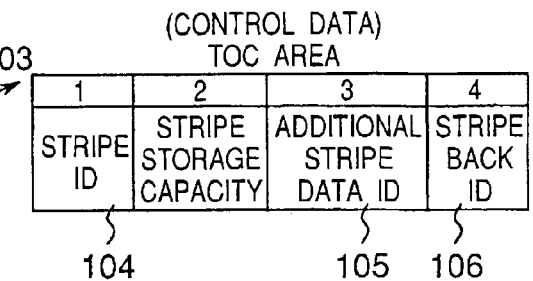

As shown in FIG. 1B, the control data 103 in the main information in the TOC area in the optical disk includes data on the additional data. The data includes a stripe data identifier 104, a stripe recording capacity, an additional stripe data identifier 105, and a stripe back side identifier 106.

The stripe data identifier 104 shows the existence of additional information. When an optical disk is reproduced, by reproducing the TOC, it is decided according to the stripe data identifier 104 whether additional data (stripes) are recorded, so that the additional data 101 can be surely reproduced.

The additional stripe data identifier 105 shows the existence of a part of additional information added at a later time. Because the additional stripe data identifier 105 and the stripe recording capacity are recorded, when additional information 101 at the first trimming time is already recorded, the maximum capacity which can be recorded for additional information 107 at the second trimming time can be calculated. Then, when a recorder for additional information records additional information 107 at the second trimming time according to the TOC data, the maximum capacity thereof can be decided. Thus, recording performed over 360° to destroy the additional information 101 recorded at the first trimming time can be prevented. As shown in FIG. 1A, by providing a space 108 equal to or larger than one frame of pit signals between the additional information 101 recorded in the first trimming time and that 107 recorded in the second one, it can be prevented that the previous additional information is destroyed.

The stripe back side identifier 106 shows the existence of additional information recorded at the back side of the optical disk. By using the identifier, the barcode-like additional information 101 can be reproduced surely even for an optical disk of a double side type such as a DVD. Further, data can be read from the back side when the stripes of the additional data extend through the two reflecting films, it can be decided whether the additional information is recorded at the back side opposite to a side from which data are reproduced. When the additional information is recorded at the back side of the optical disk, the recording layer at the back side is reproduced.

Further, when an addition times identifier (not shown) is recorded, data can be discriminated between the stripes or additional information 101 at the first time and those 107 at the second time. Therefore, additional recording becomes impossible.

Figure 2A:
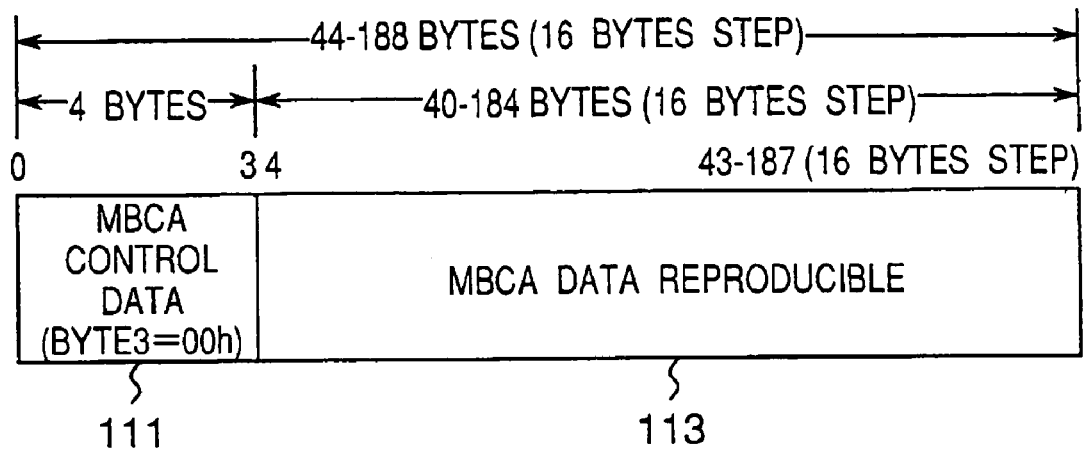
FIGS. 2A and 2B are diagrams of physical format of additional information in an optical disk.
Figure 2B:
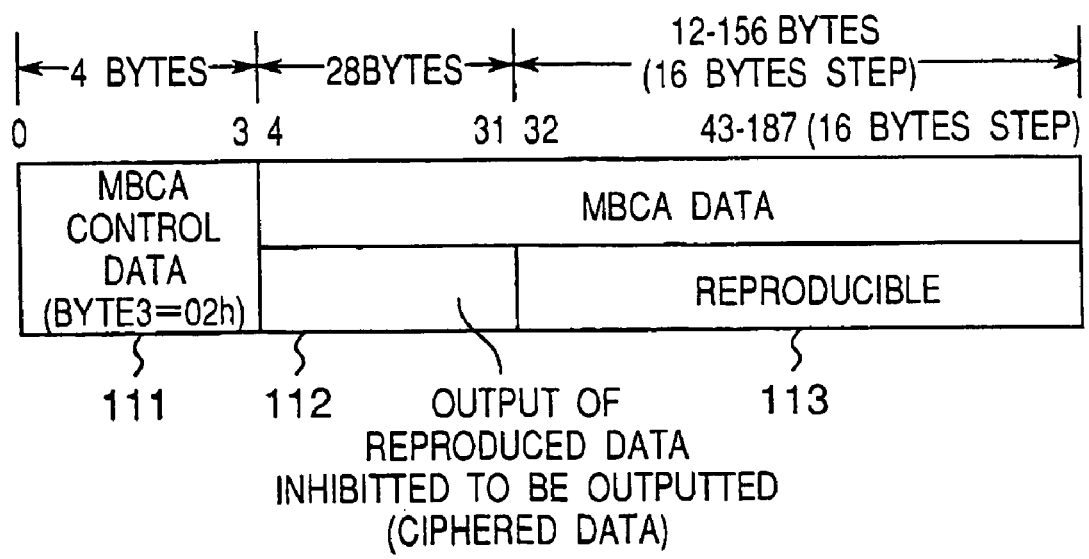

Next, a format structure of additional information is explained. FIGS. 2A and 2B show a physical format of additional information provided as MBCA signals in an optical disk. The MBCA signals include control data 111. The control data 111 is set as 4-byte synchronization code. If the shortest recording period is set to 30 $\mu$m and the largest radius is set to 23.5 mm, the memory capacity of the additional information is limited to 188 bytes or less after formatting. An identifier in the control data 111 discriminates a case (A) when all the MBCA data 113 can be reproduced to be outputted, and a case (B) when an information 112 inhibited to be outputted on reproduction is included. Thus, it can be easily discriminated according to the control data 111 included in the additional information (stripe signals) whether the optical disk includes signals 112 inhibited to be outputted from a recording and reproducing apparatus. If byte 4 in the control data is "00000000", all the additional information can be reproduced and outputted from the recording and reproducing apparatus, while if it is "00000010", 28-byte additional information 112 among the 188-byte additional information is inhibited to be outputted from the recording and reproducing apparatus. Further, the data 112 are recorded as ciphered data. Therefore, only the remaining 144-byte data 113 can be externally outputted. A reproducing apparatus of optical disk sets a protective safety mode for recorded information in the optical disk, as will be explained later. Thus, by using the ciphered information 112 inhibited to be outputted on reproduction, an optical disk and a reproducing apparatus therefor can protect files and prevent illegal copies according additional information. Then, the protection and access right of management information of a person, a company or the like can be enhanced very much, and information such as data files can be protected, for example, by preventing illegal outflow of information.

Specifically, the data 112 inhibited to be outputted from a recording and reproducing apparatus includes a part of identification (ID) information of the disk, a part of ciphered ID information, a part of information on a secret key for deciphering the ciphered ID information or a key for descrambling the main information based on ID information. Because a user cannot reproduce a part of the additional information, illegal processing or interpolation of the additional information such as MBCA data become difficult.

Next, an operation for an optical disk having the above-mentioned structure is explained below. For an optical disk having the recording layer as a perpendicular magnetization layer having magneto-optical effect, recording and erasing are performed by heating the recording layer locally with a laser beam to a temperature above the compensation temperature having a low coercive force, or above a temperature around the Curie temperature in order to decrease the coercive force of the recording layer around the irradiated portion, and by magnetizing it in a direction of the external magnetic field. (That is, information is recorded with so-called "thermo-magnetic recording".) Reproduction of the recorded signal is performed by heating the recording layer locally with a laser beam having a smaller intensity than the counterpart on recording or on erasing, and a rotation in the polarization plane of the reflecting or transmitting light according to the direction of magnetization is detected with an analyzer as a change in optical intensity. The rotation is caused by a magneto-optical effect such as Kerr effect or Faraday effect. In this case, in order to realize high density recording by decreasing interference between reverse magnetizations, a magnetic material having perpendicular anisotropic magnetization is used as the recording layer in the optical disk. As a material of the recording layer, a material is used which can record information by inducing temperature rise or chemical change due to light absorption when a laser beam is irradiated. On reproduction, a local change in the recording layer is detected with a laser beam having an intensity or frequency different from that on recording, and a reproduction signal is detected according to the reflecting or transmitting light.

Figure 3A:
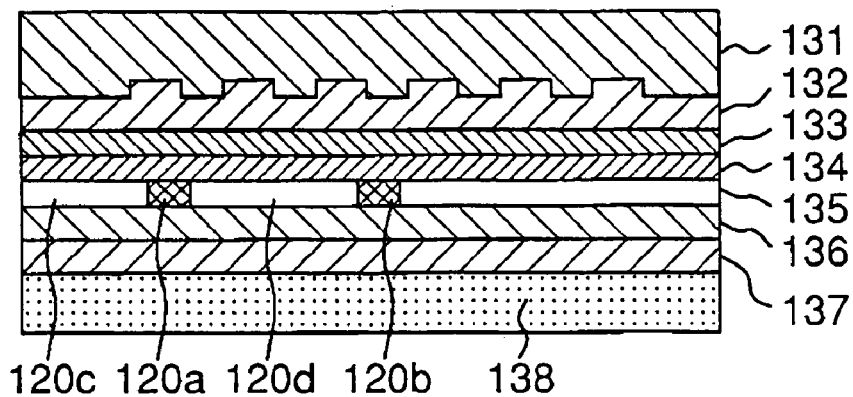
FIGS. 3A and 3B are a sectional view of a magneto-optical disk of an embodiment of the invention and a diagram of a waveform of signals on recording and on reproduction.

FIG. 3A is a sectional view of a structure of the magneto-optical disk. On a disk substrate 131, a recording layer is formed via a dielectric layer 132, and the recording layer has a three-layer structure consisting of a reproduction magnetic film 133, an intermediate insulating film 134 and a recording magnetic film 135. The recording layer comprises a plurality of layered magnetic thin films made of different materials or compositions, the thin films having exchange coupling or static-magnetic field coupling between them. In this structure, a reproduction signal is detected by increasing a signal level on reproduction. An intermediate dielectric layer 136 and a reflection layer 137 are formed successively on the recording layer, and an overcoat layer 138 is formed further thereon. In the recording layer, a plurality of BCAs 120a and 120b are formed along the circumferential direction. BCA (Burst Cutting Area) denotes an area where stripe-like marks longer in the radial direction are formed (similar to a barcode).

Next, a method is explained for producing the magneto-optical disk. First, a disk substrate 131 having guide grooves or prepits for tracking guide is produced with injection molding for a polycarbonate resin. Next, a dielectric layer 132 of SiN film of thickness 80 nm is formed on the disk substrate 131 with reactive sputtering with a silicon target in an environment including argon and nitrogen gas. A recording layer consists of a reproduction magnetic film 133 made of GdFeCo film having Curie temperature Tc1, compensation composition temperature Tcomp1 and coercive force Hc1, an intermediate insulating film 134 made of SiN film as a nonmagnetic dielectric film and a recording magnetic film 135 made of TbFeCo film having Curie temperature Tc2 and coercive force Hc2. On the dielectric layer 132, the magnetic films are formed with DC sputtering with an alloy target in an argon atmosphere, and the nonmagnetic dielectric layer is formed with reactive sputtering with a silicon target in an environment including argon and nitrogen gas. The layers in the recording layer are formed successively. Next, an intermediate dielectric layer 136 made of SiN film of thickness 20 nm is formed on the recording layer with reactive sputtering with a silicon target in an environment including argon and nitrogen gas. Next, a reflecting layer 137 made of AlTi film of thickness 40 nm is formed on the intermediate dielectric layer 136 with DC sputtering with an AlTi target in an argon atmosphere. Finally, an ultra-violet-rays setting resin is applied to the reflecting layer 137 by dropping it on the reflecting layer 137 and by rotating it with a spinner at a revolution of 3,000 rpm, and it is set with ultra-violet-rays to form an overcoat layer 138 of film thickness of 8 $\mu$m.

In the recording layer in the magneto-optical disk, the reproduction magnetic film 133 has film thickness of 40 nm and a composition having Curie temperature Tc1 of 320° C., compensation composition temperature Tcomp of 310° C. and magnetic anisotropy in a direction in a film plane at room temperature. The intermediate insulating film 134 is a nonmagnetic SiN film of film thickness of 20 nm. The recording magnetic film 135 has film thickness of 50 nm, Curie temperature Tc3 of 280° C., and coercive force Hc3 at room temperature of 18 kOe.

Figure 4:
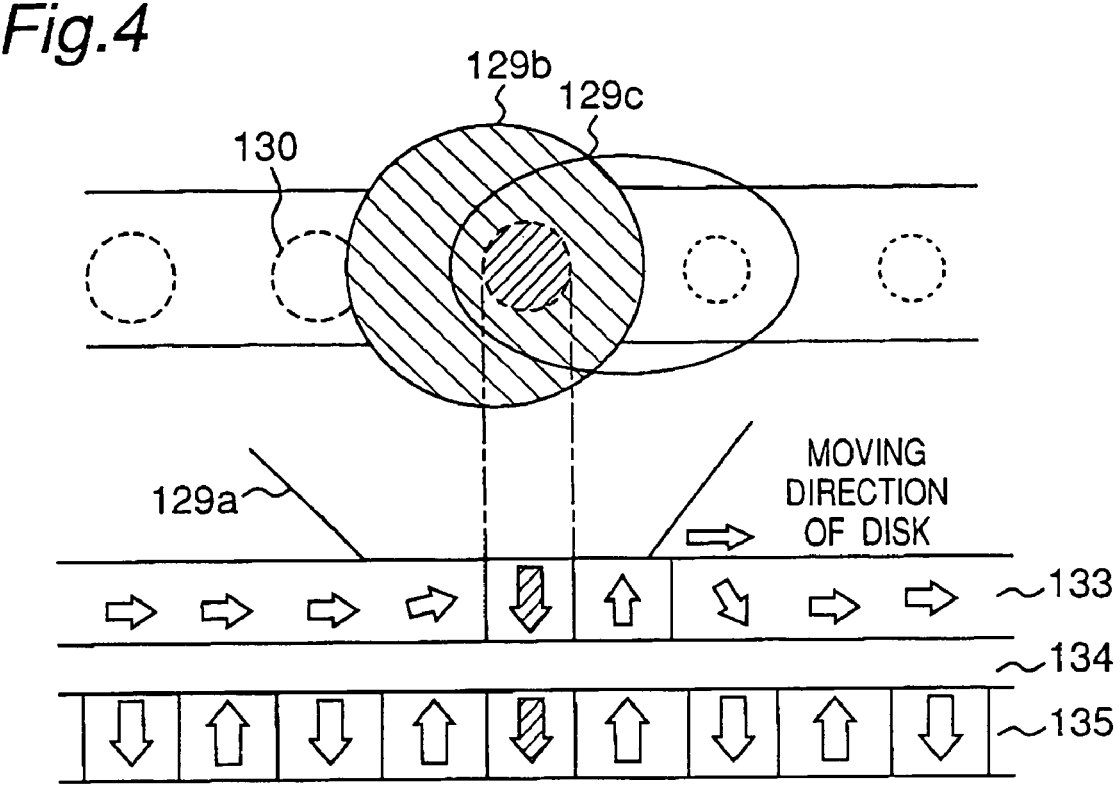
FIG. 4 is a schematic plan view of a magneto-optical disk using magnetic super-resolution and a diagram of reproduced signals.

Next, the principle of reproduction in the three-layer-structure recording layer is explained with reference to FIG. 4. A recording domain 130 of information signal is recorded in the recording magnetic film 135. At room temperature, the reproduction magnetic film 133 has magnetic anisotropy along a direction in the film plane, and the magnetization in the recording magnetic film 135 is small. Then, the static magnetic field from the recording magnetic film 135 is remained insulating by the intermediate insulating film 134, and the magnetization is not transferred to the reproduction magnetic film 133. Therefore, when a signal is reproduced, as to a low temperature portion 129b in the laser light spot 129a, a signal in the recording magnetic film 135 is not transferred to the reproduction magnetic film 135. However, as to a high temperature portion 129c in the laser light spot 129a, the temperature of the reproduction magnetic film 133 is increased to about the compensation composition temperature, and this decreases the magnetization of the reproduction magnetic film 133 to induce magnetization in the film normal direction. Further, the magnetization of the recording magnetic film 135 is increased due to temperature rise, so that magnetic coupling due to static magnetic field is effective. Thus, the magnetization direction in the reproduction magnetic film 133 is transferred in the direction of recording magnetic layer 135. Then, the recording domain 130 of information signal is masked as to the low temperature portion 129b in a part of the laser light spot 129a. Therefore, the recording signal is reproduced only from the high temperature portion 129c in the center of the laser light spot 129a. In this reproduction method, the static magnetic field is exerted through the intermediate insulating film 134 provided between the reproduction magnetic film 133 and the recording magnetic film 135, and the signal of the recording magnetic layer 135 is transferred to the reproduction magnetic film 133 only from the high temperature portion in the center of the light spot 129a. This is a magnetic super-resolution method called as "CAD" using static magnetic field, where a signal is reproduced only from a central portion having a high temperature caused by the laser light spot. By using this method, a signal can be reproduced from an area smaller than the laser light spot. Reproduction is also possible by magnetic super-resolution methods using exchange coupling between the magnetic layers, called as "FAD" where a signal is reproduced only from a low temperature portion in the laser light spot, or called as "RAD", where a signal is reproduced only from a high temperature portion in the laser light spot.

Figure 5A:
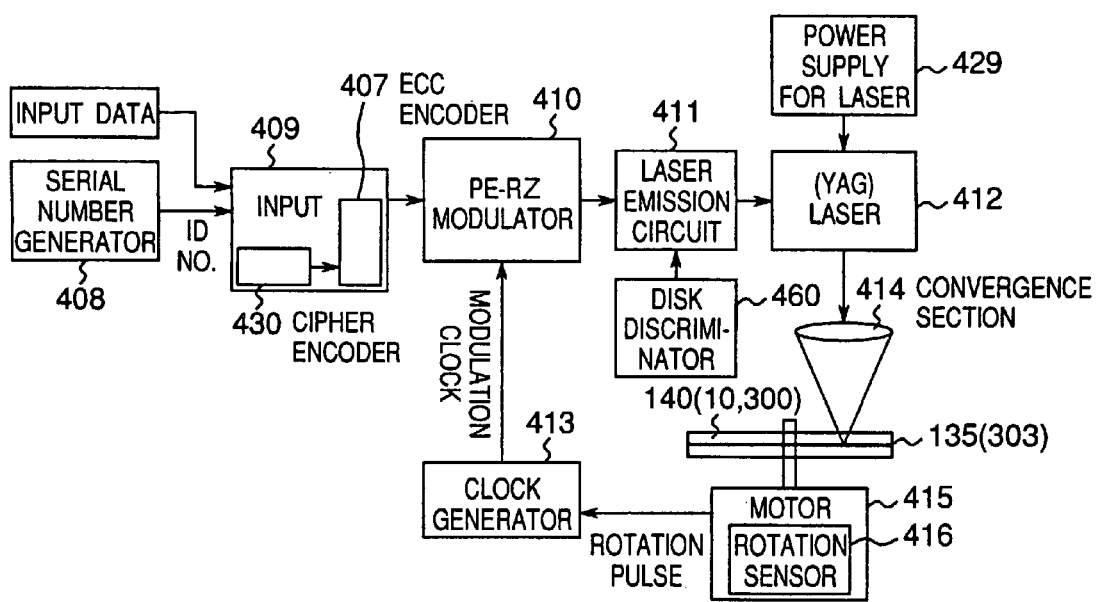
FIG. 5A is a block diagram of a recording apparatus for additional information in the embodiment of the invention.
Figure 5B:
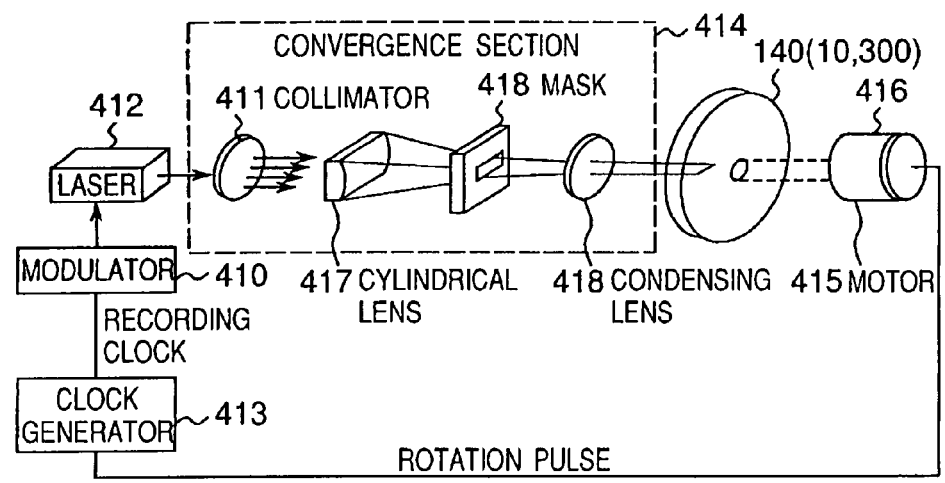
FIG. 5B is a perspective view of a laser section of the recording apparatus for additional information.

Next, a method of recording additional information to the magneto-optical disk is explained with reference to FIGS. 5A and 5B. FIG. 5A is a block diagram of a recording apparatus for additional information, and FIG. 5B is a diagram of an optical structure of the recording apparatus. For the compatibility with a recording and reproducing apparatus for a DVD disk, RZ (Return to Zero) recording method is used for recording additional information, and the format of recording signals also has compatibility.

First, by using a magnetization apparatus (not shown), the direction of the magnetization in the recording layer in the magneto-optical disk is arranged in one direction. Because the recording magnetic film 135 is a perpendicular magnetization film having coercive force of 18 kOe, the intensity of magnetic field of an electromagnet in the magnetization apparatus is set to 20 kilogauss. By moving the magneto-optical disk before the magnetization apparatus, the direction of the magnetization in the recording layer can be arranged in one direction. A disk identification (ID) generated by a serial number generator 408 is inputted to an input section 409, and the disk ID is ciphered by a cipher encoder 430 and encoded by an ECC encoder 407. Next, it is modulated by a PE-RZ modulator 410 according to modulation clocks and sent to a laser emission circuit 411. Next, as shown in the light convergence section 414 in the laser recording device shown in FIG. 5B, a laser 412 such as a YAG laser having a high output power and a lens 417 such as a cylindrical lens for converging the light in a direction are used to converge a laser beam of a stripe-like rectangle longer in the radial direction on the recording layer, and a plurality of BCAs 120a and 120b are formed along circumferential direction of the disk. As to the recorded signals, the BCAs 120a and 120b are detected with a BCA reader (not shown) and subjected to PE (phase encoding) decoding. Then, it is compared with the recorded data, and if they agree with each other, the recording of the additional information is completed. In the magneto-optical disk, a width of fluctuation in reflectance is within 10%. Therefore, focus control and the like are not affected.

Figure 3B:
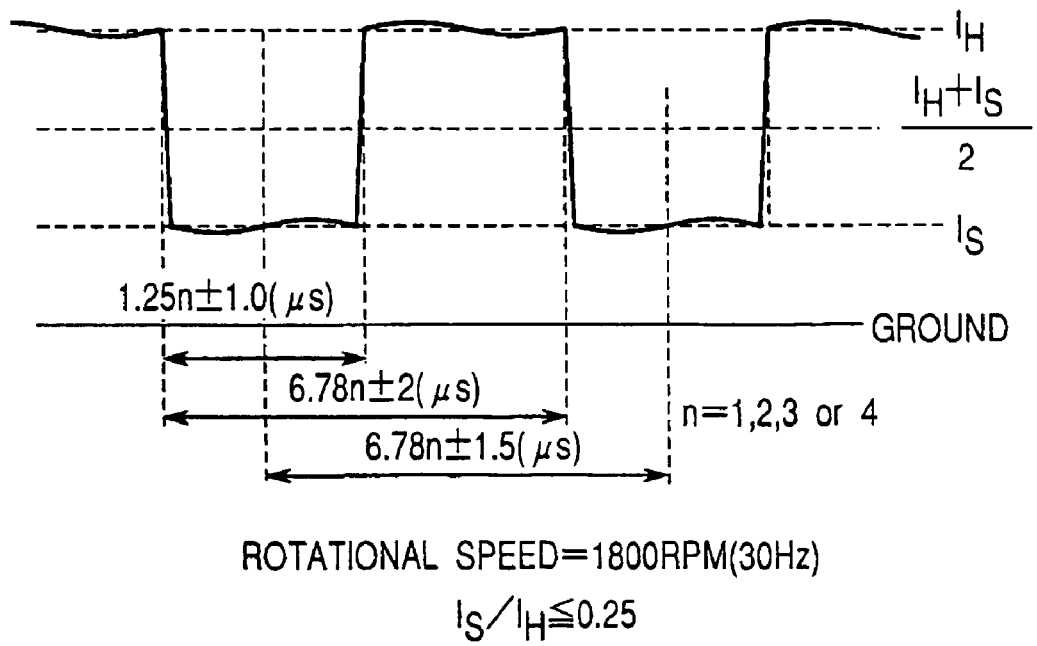
Figure 6:
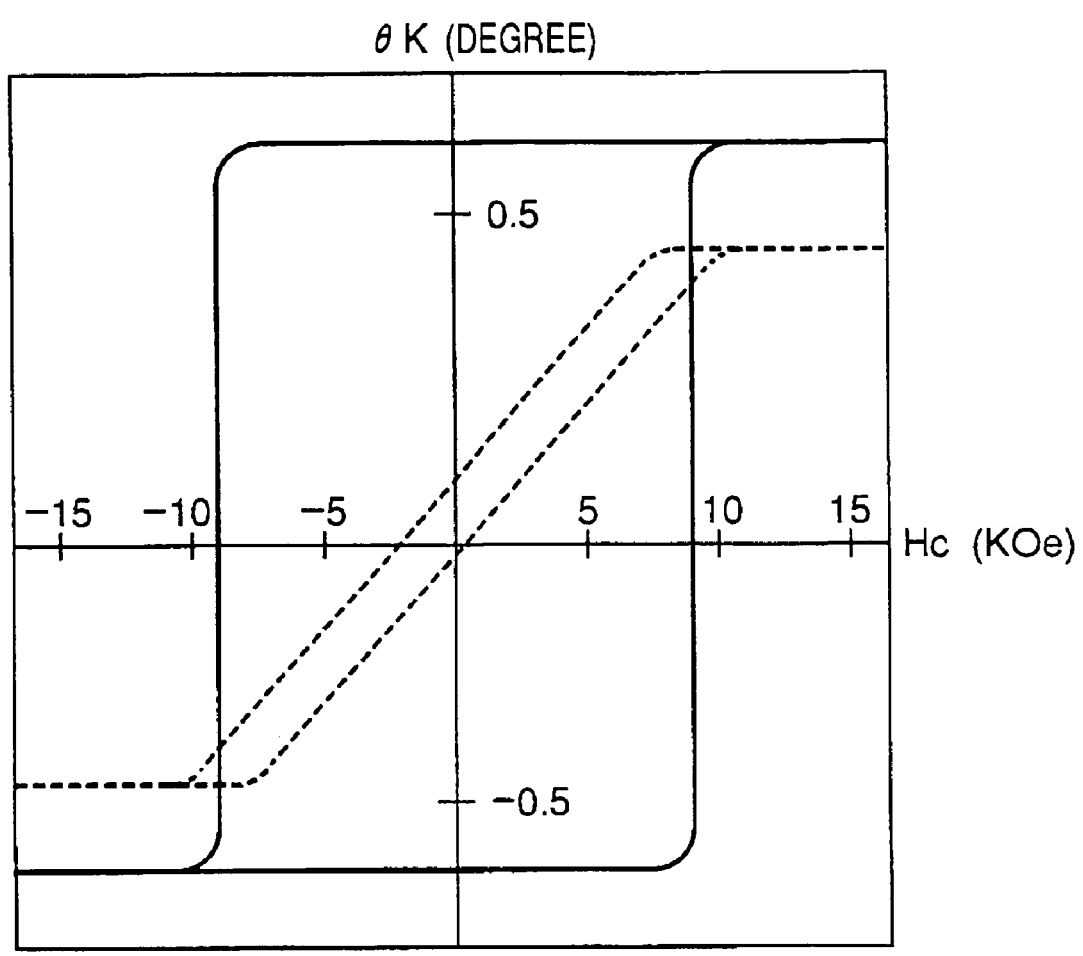
FIG. 6 is a diagram of a Kerr hysteresis loop in a direction perpendicular to a film plane of a BCA subjected to heat treatment and a non-BCA not subjected to heat treatment in a recording layer in a magneto-optical disk.

Next, the principle of reproduction of BCA signals or additional information is explained. FIG. 6 shows a Kerr hysteresis loop in a direction perpendicular to a film plane of BCAs 120a, 120b, and non-BCAs 120c, 120d (FIG. 3A). It is found that the Kerr rotation angle and the anisotropy of perpendicular magnetization of the BCA 120a subjected to heat treatment are deteriorated to a large extent. Because the BCA 120a has low anisotropy of perpendicular magnetization because of the heat treatment with irradiation of laser beam (or the magnetic anisotropy in the film plane is dominant), the remnant magnetization vanishes in the film normal direction. Then, the magneto-optical recording cannot be performed, and a detection signal is not outputted. However, if a portion other than the BCA in the recording layer or the non-BCA is irradiated, because the portion is magnetized in the film normal direction, the polarization plane of the reflection light is rotated, and a differential signal of a photodetector (PD) divided into two areas is outputted. As shown in FIG. 3B, a reproduction waveform of the additional information can be obtained from the differential signal due to the rotation of the polarization plane. As explained above, from the BCA reproduction signal, the signal of additional information of the BCAs can be detected with an optical head for recording and reproducing a magneto-optical disk.

By using a BCA trimming device of Matsushita Electric Industry, a BCA recording device (CWQ pulse recording with YAG laser 50 W lamp excitation), having a structure shown in FIG. 5, BCA signals are recorded actually at a recording power of BCA recording for a magneto-optical disk from a light-entering side of the disk.

Next, a recording and reproducing apparatus is explained with reference to FIGS. 7 and 8. For an optical disk such as DVD-ROM, DVD-RAM or DVD-R, the structure and detection method of reproduction signals are different from the optical head shown in FIG. 8, but the basic structure and the basic operation of a reproducing apparatus for an optical disk are common, as shown in FIG. 7.

Figure 8:
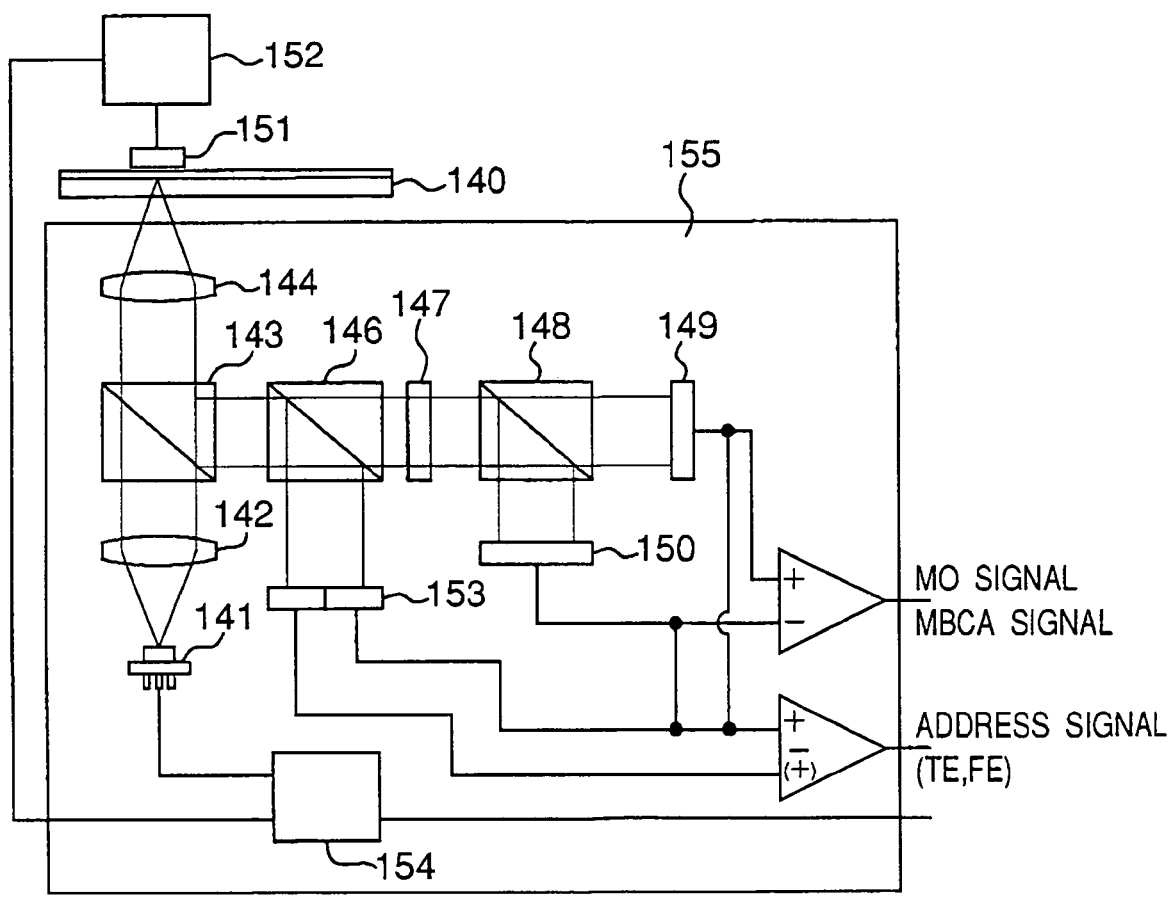
FIG. 8 is a diagram of an optical structure of the recording and reproducing apparatus for a magneto-optical disk.

FIG. 8 shows an optical structure of a recording and reproducing apparatus for a magneto-optical disk. In an optical head 155, a laser beam of linear polarization emitted from a laser light source 141 is converted by a collimating lens 142 to become a laser beam of collimated light. Only P polarization in the laser beam transmits a polarization beam splitter 143, is condensed by an object lens 144, to irradiate the recording layer in the magneto-optical disk 140. Information of ordinary recording data (main information) is recorded by partially changing the directions (or up and down directions) of magnetization in the perpendicular magnetization film, and the reflecting (or transmitting) light from the magneto-optical disk 140 is changed as to rotation in the polarization plane according the magnetization state due to the magneto-optical effect. The reflecting light with the polarization light with rotated polarization plane is reflected by the polarized beam splitter 143, and separated by a half mirror 146 in the signal reproduction direction and in the focus tracking control direction. After the light separated in the signal reproduction direction is rotated by 45° in the polarization plane by a λ/4 plate 147, the P and S polarization components are separated by a polarized beam splitter 148 along respective propagation directions. The lights separated in two directions are detected by photodetectors 149 and 150. Then, the change in rotation in the polarization plane is detected as a differential signal of the light intensities detected by photodetectors 149 and 150, and a reproduction signal of the data information is obtained from the differential signal. Further, the light in the focus tracking control direction separated by a half mirror 146 is used by a focus tracking photosensing portion 153 for focus control and for tracking control. A magnetic head 151 is driven by a driver 152.

A BCA as additional information in the magneto-optical disk is detected with a reproduction method similar to the main information. The BCAs 120a, 120b subjected to heat treatment are deteriorated on the perpendicular magnetic anisotropy to a large extent (refer to hysteresis loop 120a in FIG. 6). Because the direction of the magnetization in the perpendicular magnetization film is arranged in the one direction when the magnetic layer is fabricated or the signals are reproduced, the laser beam incident on the non-BCAs 120c, 120d having large perpendicular magnetic anisotropy and not subjected to heat treatment is rotated by θk in a direction to be reflected. On the other hand, because the BCAs 120a, 120b subjected to heat treatment and having deteriorated perpendicular magnetic anisotropy has a very small Kerr rotation angle, the incident laser beam is reflected without rotated on its polarization plane.

Figure 7:
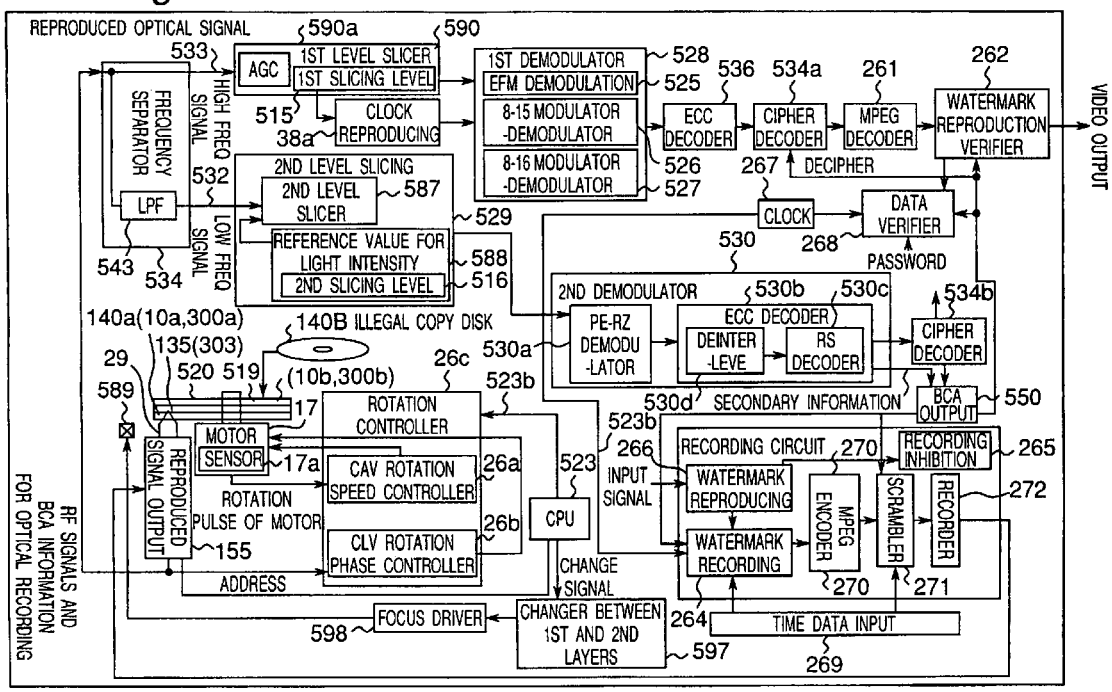
FIG. 7 is a block diagram of a recording and reproducing apparatus for a magneto-optical disk.

In the recording and reproducing apparatus for a magneto-optical disk shown in FIG. 7, as a method for arranging the direction of the magnetization in the perpendicular magnetization film in one direction when the BCAs are reproduced, a laser light equal to or larger than 4 mW is irradiated to heat the recording magnetic film 135 in the recording layer in the magneto-optical disk 140 above the Curie temperature, while a constant magnetic field equal to or higher than 100 Oe is applied by the magnetic head 151 to the magneto-optical disk 140. As a result, the additional information in the BCAs are detected by a differential signal which is similar to that for the main information as a change in the polarization direction in the recording layer.

In this embodiment, the additional information is detected from the differential signal as explained above. By using the reproduction method, a component of fluctuation of light intensity without light polarization can almost be cancelled. Then, it is advantageous for decreasing noises due to fluctuation of light intensity.

Figure 9A:
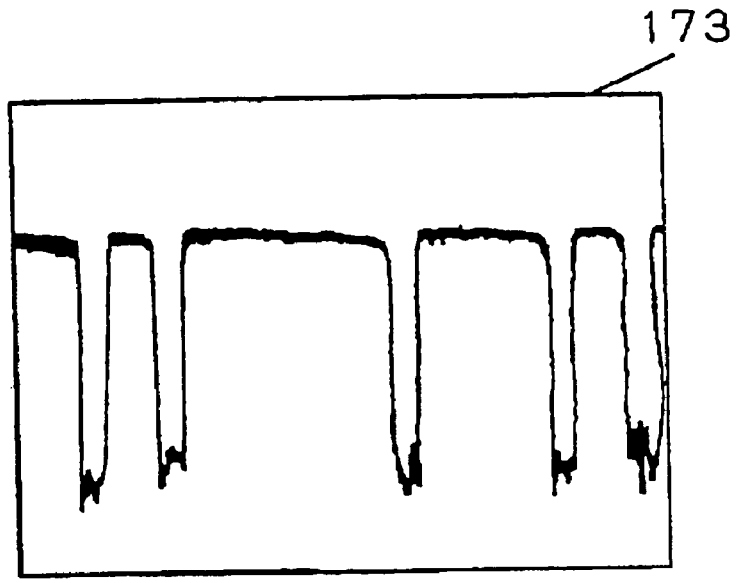
FIGS. 9A and 9B are trace diagrams of a waveform of difference signal of BCA signal and that of addition signal when recording current for the disk is 8 A.
Figure 9B:
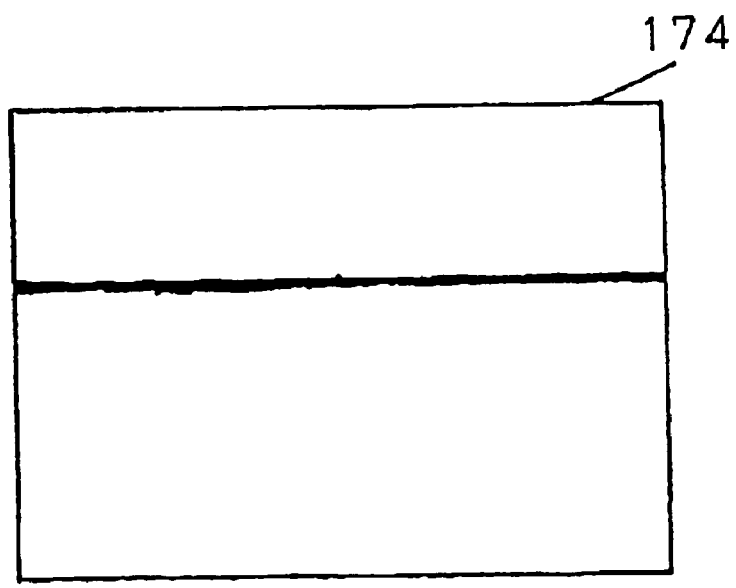

When the additional information is detected and a waveform photograph is traced, FIG. 9A shows a waveform photograph of the differential signal, and FIG. 9B shows that of the additional signal. As shown in FIG. 9A, it is found that a pulse waveform of BCA signals having a sufficient amplitude ratio is detected on the differential signal. The recording layer is changed only on the magnetic characteristics, and when a part of the recording layer is crystallized, a change in average refractive index is equal to or smaller than 5%, so that a change in the intensity of reflecting light from the magneto-optical disk is equal to or smaller than 10%. Therefore, a change in reproduction waveform caused by the change in the intensity of reflecting light is very small. At this time, reproduction waveforms as shown in FIGS. 9A and 9B are obtained by setting recording current of laser light to 8–9 A, and a BCA image is observed not with an optical microscope, but only with a polarization microscope.

In the above-mentioned embodiment, after the direction of magnetization of the recording magnetic film 135 in the recording layer is aligned along one direction (or magnetized), BCA signals as additional information are recorded, or by using a recording and reproducing apparatus, a laser light is irradiated to a disk to which BCA signals are recorded while applying a magnetic field in a direction. It is also possible to align the direction of the magnetization of the perpendicular magnetization film in the recording layer in a direction. The recording layer 135 in the magneto-optical disk has coercive force of 18 kOe at room temperature. When the temperature is increased to 100° C. or above by irradiation with a strobe light, a laser beam or the like, the coercive force is decreased to 6 kOe or less. Then, the direction of magnetization in the recording layer is aligned in a direction by applying a magnetic field equal to or higher than 8 kOe which is larger than the counterpart at room temperature.

In this embodiment, the recording layer has the three layer structure consisting of the reproduction magnetic layer 133, the intermediate insulating film 134 and the recording magnetic film 135. However, additional information can be recording at least by remarkably decreasing the magnetic anisotropy in a direction normal to the film plane of a portion in the recording magnetic film 135 subjected to heat treatment so that magnetic anisotropy in the plane is dominant.

Further, a similar effect is obtained even when the perpendicular magnetic anisotropy in at least one of the reproduction magnetic film 133 and the perpendicular magnetic film 135 is deteriorated, or when the perpendicular magnetic anisotropy in all the magnetic layers of the reproduction magnetic film 133, the intermediate magnetic film 134 and the perpendicular magnetic film 135 is deteriorated.

The curie temperature, coercive force and the like of the magnetic films in the recording layer can be changed easily by selection of composition and addition of various elements having different magnitudes of magnetic anisotropy. Therefore, according to the recording and reproduction conditions to be required for a magneto-optical disk, the structure and the fabrication conditions of the recording layer in a magneto-optical disk, and the recording conditions of additional information can be set appropriately.

In the above-mentioned optical disk, the disk substrate 131 is made f a polycarbonate resin, the dielectric layers 132 and 136 are made of a SiN film, and the magnetic films are made of a GdFeCo film, a TbFe film, and a TbFeCo film. However, the disk substrate 131 may be made of a glass or a plastics such as a polyolefin or PMMA. The dielectric layers 132 and 136 may be made of a different nitride film such as AlN, an oxide film such as $TaO_2$, a chalcogenide film such as ZnS, or a mixture thereof. The magnetic films may be made of a ferrimagnetic film, including a rare earth and a transition metal, having different materials or a composition, or a magnetic material having perpendicular magnetic anisotropy such as MnBi or PtCo. The structure or the magnetic layer may be a structure made of only one layer or a multi-layer structure.

Figure 10A:
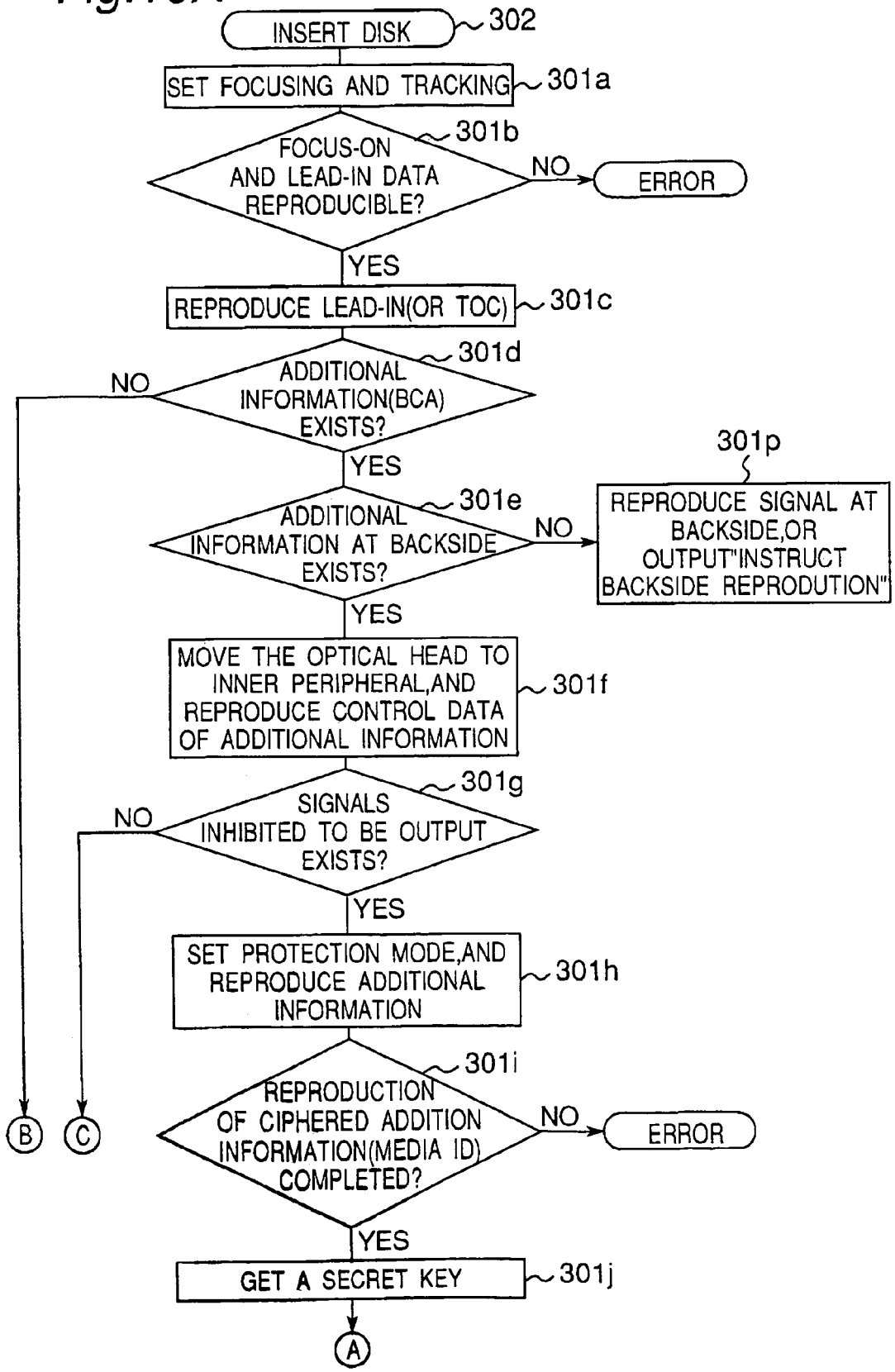
FIGS. 10A and 10B are parts of a flowchart of reproduction of additional information including signals inhibited for output of an optical disk.
Figure 10B:
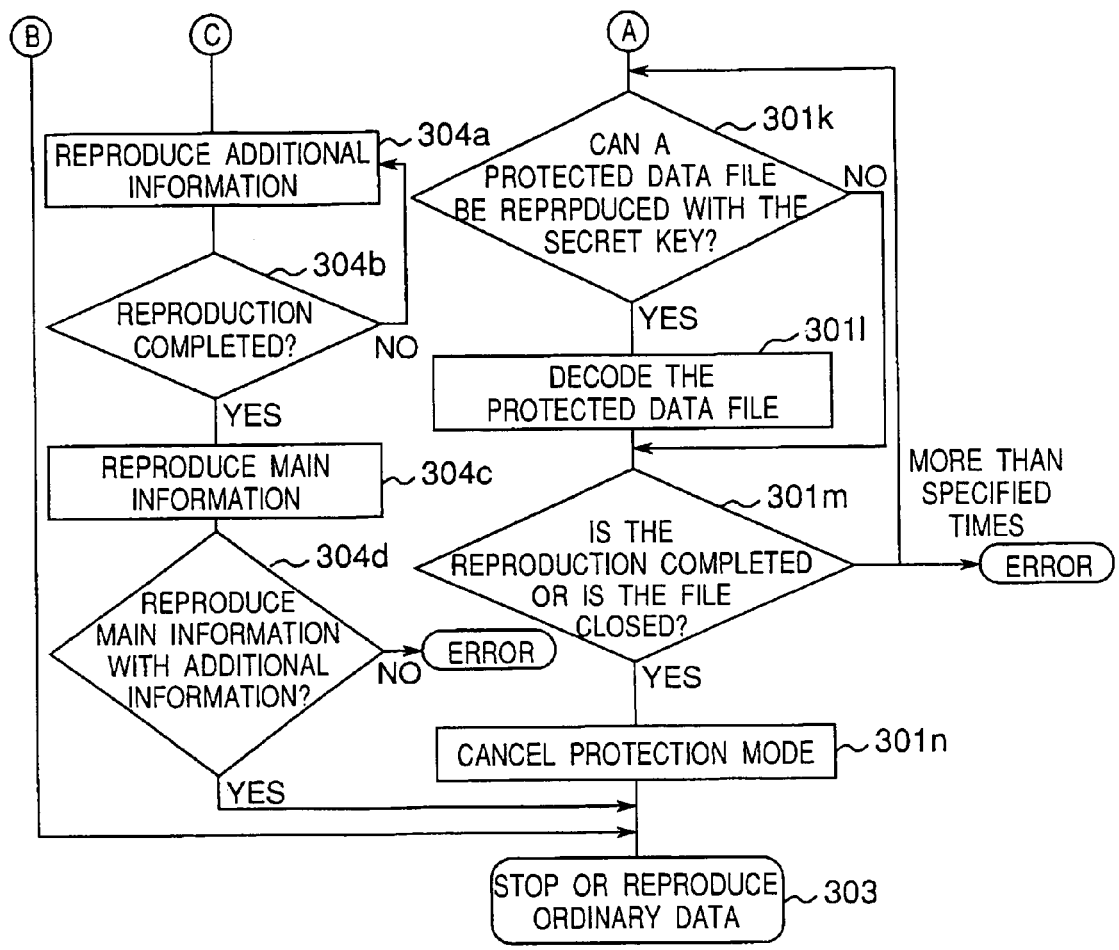

FIGS. 10A and 10B show a flowchart of a reproduction procedure using additional information. When an optical disk is inserted (step 302), focus and tracking are set first (step 301a). For a normal disk, the lead-in area is focused on so that the reproduction becomes possible (step 301b), and the TOC (Control Data) is reproduced (step 301c). When the lead-in area or the TOC is not reproduced, the flow stops as an error.

As shown in FIG. 1B, in an optical disk of the invention, a stripe identifier 104 is recorded in the TOC in the TOC area 103 in the main information. Therefore, when the TOC is reproduced, it can be decided whether the stripe is recorded. Thus, it is decided whether the stripe identifier 104 is 0 or 1 (step 301d). When the stripe identifier 104 is 0, the optical head moves to the outer periphery of the optical disk (step 303), and the rotation phase control is performed to reproduce data in the data area 110 of the ordinary main information (step 303).

The identifier in the main information for the existence of the additional information is detected based on a detection signal detected by one photodetector or on a sum signal of detection signals detected by a plurality of photodetectors in the optical head. If the existence of the additional information is determined according to the identifier, the optical head is moved to a predetermined position in the optical disk where the additional information is recorded. Thus, the stripes, defects and the like in the additional information can be easily detected. Therefore, the run-up time of the apparatus can be shortened, and the reproduction of the additional information has compatibility among optical disks using different reproduction methods.

When the stripe identifier 104 is 1, it is decided for a double-side disk such as DVD-ROM whether data are recorded in a side opposite to a side from which the stripe is reproduced, or whether a back side identifier 106 is 1 or 0 (step 301e). If the back side identifier 106 is 1, the recording layer in the back side is reproduced (step 301p). For a magneto-optical disk of single-side structure, the back side identifier 106 is always 0. If the reproducing apparatus cannot reproduce the back side of an optical disk automatically, a message of "please instruct back-side reproduction" is displayed. When stripes are found to be recorded in the side under reproduction at steps 301d and 301e, the optical head is moved to a region 101 of stripes at an inner side in the optical disk, the rotation speed is controlled, and the signal 111 in the TOC region of stripes are reproduced in CAV (constant angular velocity) rotation (step 301f).

By reproducing the signals 111 in the TOC area on stripes, if the stripes do not have a region 112 where the output from the recording and reproducing apparatus is inhibited (step 301g), stripe signals 113 are reproduced (step 304a). Next, it is decided whether the reproduction of the stripe signals 113 is completed (step 304b). When the reproduction of the stripe signals 113 is completed, the optical head moves to an outer peripheral of the optical disk (step 304c), and pit signals added with the stripe signals 113 or data of main information are reproduced (step 304d).

By reproducing signals 111 in the TOC area on stripes, if the stripes have the region 112 where the output from the recording and reproducing apparatus is inhibited (step 301g), protective safety mode for recording information in the disk is started to be set. First, a command of protective safety mode is set, and the remaining additional information 112, 113 is reproduced (step 301*h*). If a protective safety mode other than a command which can be set is set for an optical disk, an error occurs, and the disk reproduction is stopped.

When a command of protective safety mode is set and reproduction of additional information 112, 113 is completed (step 301*i*), a secret key is detected from an enciphered media ID (step 301*j*). The media ID is a signal recorded by ciphering or modulating information and it is inhibited to be outputted from the recording and reproducing apparatus. Therefore, it cannot be reproduced by a user when the disk is reproduced. Next, by using the secret key or information signals produced by using it, a reproduction command on a data file to be protected is set (step 301*k*). If a protective safety mode which cannot be set is instructed to be set for the data file in the optical disk, the reproduction mode cannot be entered. When the reproduction command for a data file to be protected is set, decoding of the protected file is started (step 301*l*). When the decoding of the protected file is not completed, the above processes from the confirmation of the secret key (step 301*k*) are repeated. If the reproduction command for the protected file cannot be set by a predetermined times or more, an error occurs, and the reproduction of the disk is stopped (step 301*m*). When the decoding is completed, the file is closed. Then, the protective safety mode is canceled (step 301*n*), and data of main information other than the protected file are allowed to be reproduced.

When the decoding is not completed (step 301*m*), the above processes are repeated from the setting of reproduction command for the data (step 301*k*).

When the reproduction of the stripes or additional information 101 is completed and the protective safety mode is canceled (step 301*n*), the optical head is moved to the outer periphery of the optical disk (step 303). Then, and the rotation phase control is started again, and data of ordinary pit signals and signals of the main information are reproduced.

As explained above, by recording the stripe identifier 104 in the pit area in TOC or the like, the stripes or additional information 101 can be surely reproduced. Further, according to the control data 111 included in the stripe signals, it is decided easily whether the optical disk includes the signals 112 which inhibits a part of the additional information of the stripes to be outputted from the recording and reproducing apparatus.

FIG. 11 shows a system comprising an optical disk recording and reproducing apparatus and a personal computer. An optical disk recording and reproducing apparatus 320 sends information of an optical disk 140 through an interface 321 such as a small computer system interface (SCSI) to a personal computer 322. The information is processed by a central processing unit (CPU) 323 in the computer 322 and stored in a memory area 324. The interface may also be an interface such as AT attachment packet interface (ATAPI), IEEE 1394 or universal serial bus (USB) which can transmit main and additional information.

In a prior art optical disk, additional information such as BCA signals are also reproduced in order to determine whether use, process, copy or the like of the main information is possible, for processing the main information. However, because all the contents of the additional information can be reproduced and sent to a computer, even if the identification information or the like is ciphered, it may be deciphered. In this embodiment, a part of the additional information may include information inhibited to be outputted and to be used only in the optical disk drive. Then, reproduction in such a case is explained below.

Figure 12:
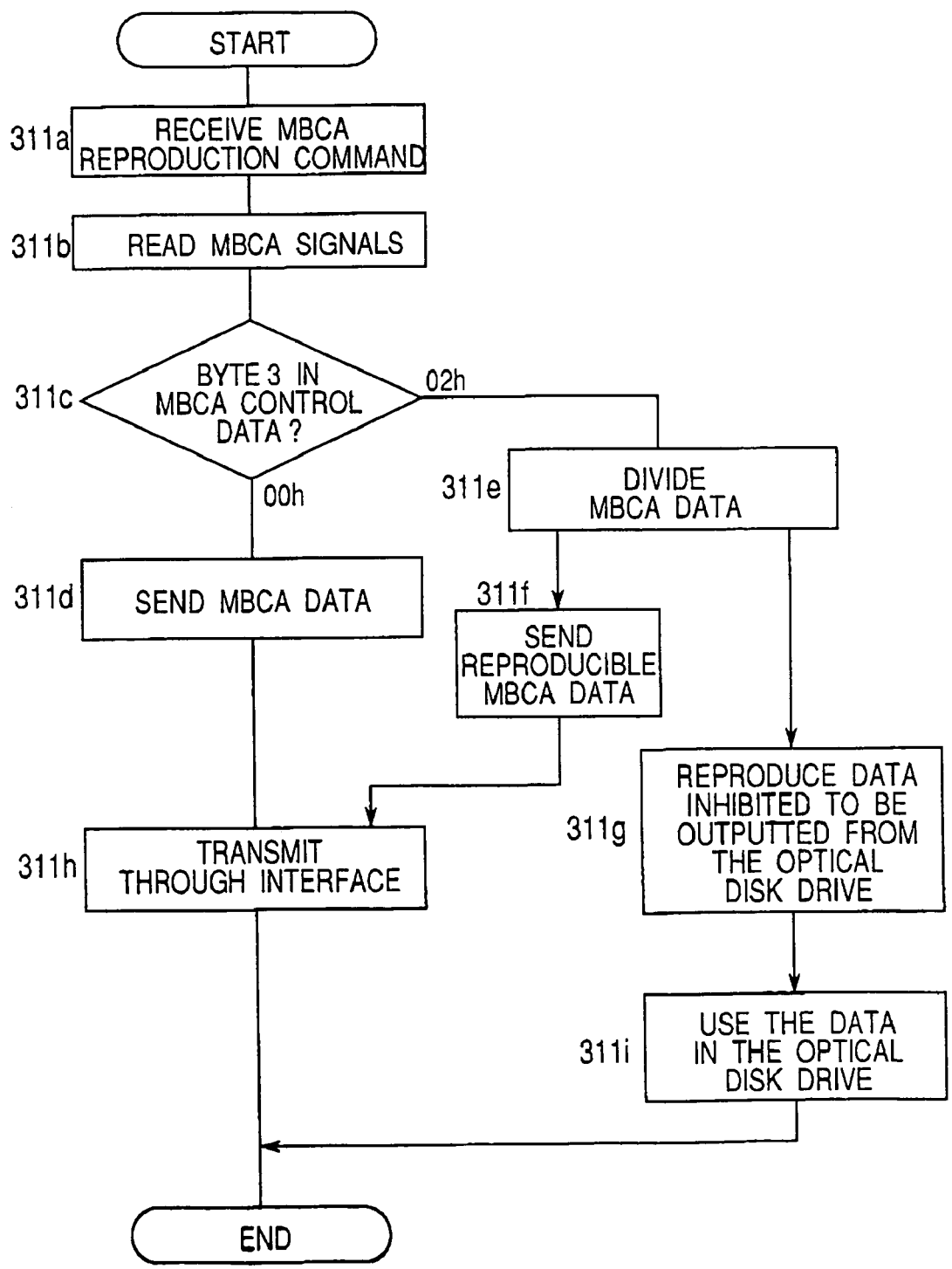
FIG. 12 is a flowchart of demodulation of MBCA signals.

FIG. 12 shows a flow of reproduction of MBCA signals as additional information in an optical disk. First, in order to reproduce MBCA signals, a MBCA reproduction command is received through the interface 321 to the computer 322 (step 311*a*). Then, the recording and reproducing apparatus 320 reads MBCA signals and stores them in a memory therein (step 311*b*).

Next, for MBCA signals having a format shown in FIG. 2, byte 3 in the control data in the MBCA signals is first reproduced (step 311*c*). If byte 3 is "00h", the MBCA data are all sent (step 311*d*), and they are transmitted through the interface 321 to the computer 322 (step 311*h*), so that all the contents of the MBCA signals can be confirmed by the personal computer 322.

If byte 3 is "02h", the MBCA data are divided into data which can be transmitted and data inhibited to be transmitted (step 311*e*), and only the data which can be transmitted are transmitted from the recording and reproducing apparatus (step 311*f*) and sent through the interface 321 to the computer 322. On the other hand, as to the data inhibited to be transmitted from the recording and reproducing apparatus, they are reproduced in the apparatus (step 311*g*), but are not externally outputted (step 311*i*). Therefore, all the contents of the MBCA signals cannot be confirmed in the computer 322, so that the additional information such as identification inherent to a disk cannot decoded. Therefore, for an optical disk including signals 112 inhibited to be outputted from the apparatus in a part of the additional information, a user cannot reproduce stripe information 112 on the disk identification (ID) or the secret key, and the main information can be protected very strongly for an optical disk and for a recording and reproducing apparatus therefor.

An optical disk is reproduced according to the above-mentioned processes, and the decoding operation is explained briefly by using the recording and reproducing apparatus for an optical disk shown in FIG. 7. In an optical disk 140*a* wherein BCA signals of additional information are recorded, a stripe identifier 104 (refer to FIG. 1B) showing whether BCA exists is recorded in the control data 103 in the main information. For a doubleside type disk such as a DVD-ROM disk 10, two transparent substrates are laminated so that the signal plane is located therein. The recording layer 10 may be comprised of a single layer, or two layers of recording layers 10*a* and 10*b*. When the recording layer consists of two layers, a stripe identifier 104 showing whether a BCA exists is recorded in the control data in the first recording layer 10*a* which is near the optical head 155. In this case, because the BCA exists in the second recording layer 10*b*, the first recording layer 10*a* is focused first, and the optical head 155 is moved to a radial position of the control data existing at the most inner side in the second recording region 10*b*. Because the control data are main information, they are subjected to EFM, 8-15 or 8-15 modulation. Only when the stripe back side identifier 106 in the control data is "1", the second recording layer 10*b* is focused by a changer 597 for changing between the first and second layers to reproduce a BCA.

The signals of main information are sliced by a first level slicer 590 with a general first slicing level 515 to be converted to digital signals. The digital signals are decoded by an EFM decoder 525, an 8-15 decoder 526 or an 8-16 decoder 527 in the first decoder 528, and they are outputted after subjected to error correction in an ECC decoder 536. Then, they are processed further in a cipher decoder 534*a*, an MPEG decoder 261 and a watermark reproduction verifier 262, if necessary. Thus, the control data in the main information are reproduced, and only when the stripe identifier is "1", a BCA is read. If the stripe back-side identifier 106 is "1", the CPU 523 instructs the changer 597 for the first and second layers to drive a focus adjuster 598 so as to change the focus from the first recording layer 10a to the second one 10b. At the same time, the optical head 155 is moved to the radial position of the recording region 101 for additional information (a BCA recorded between 22.3 and 23.5 mm at the inner peripheral side in the control data) in order to read the BCA.

Figure 1C:
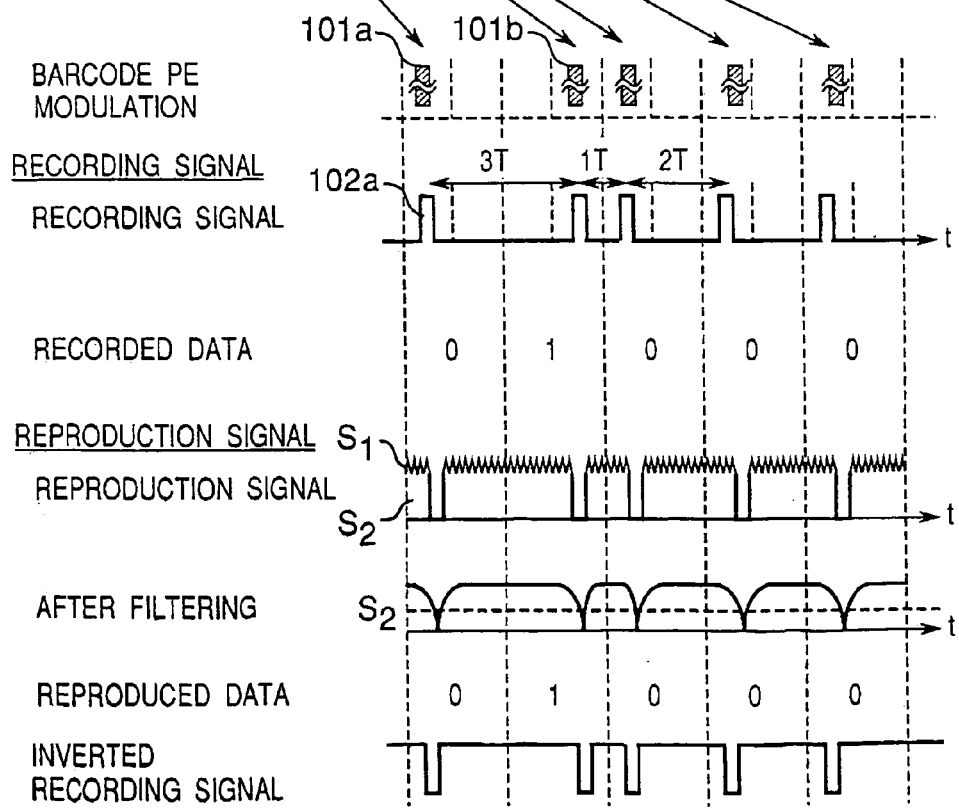

In a BCA, signals having a partially dripped envelope are reproduced, as shown in the reproduction signal in FIG. 1C. By setting a second slicing level 516 having a lower light intensity than the first one 515 in the second level slicing section 529, a BCA without no rotation of polarization plane of BCA or a BCA without the reflecting layer is detected, and digital signals are reproduced. The digital signals are demodulated by a PE-RZ decoder 530a and are subjected to ECC decoding by an ECC decoder 530b to be outputted as BCA data of additional information through an output section 550. Thus, the main information is demodulated and reproduced by the first demodulator 528, and the BCA data as additional information are demodulated and reproduced.

However, in the optical disk according to the embodiment, additional information 112 which is inhibited to be outputted is not outputted from the second demodulator to the BCA output section 550, and only the other reproduction signals are outputted.

Figure 13:
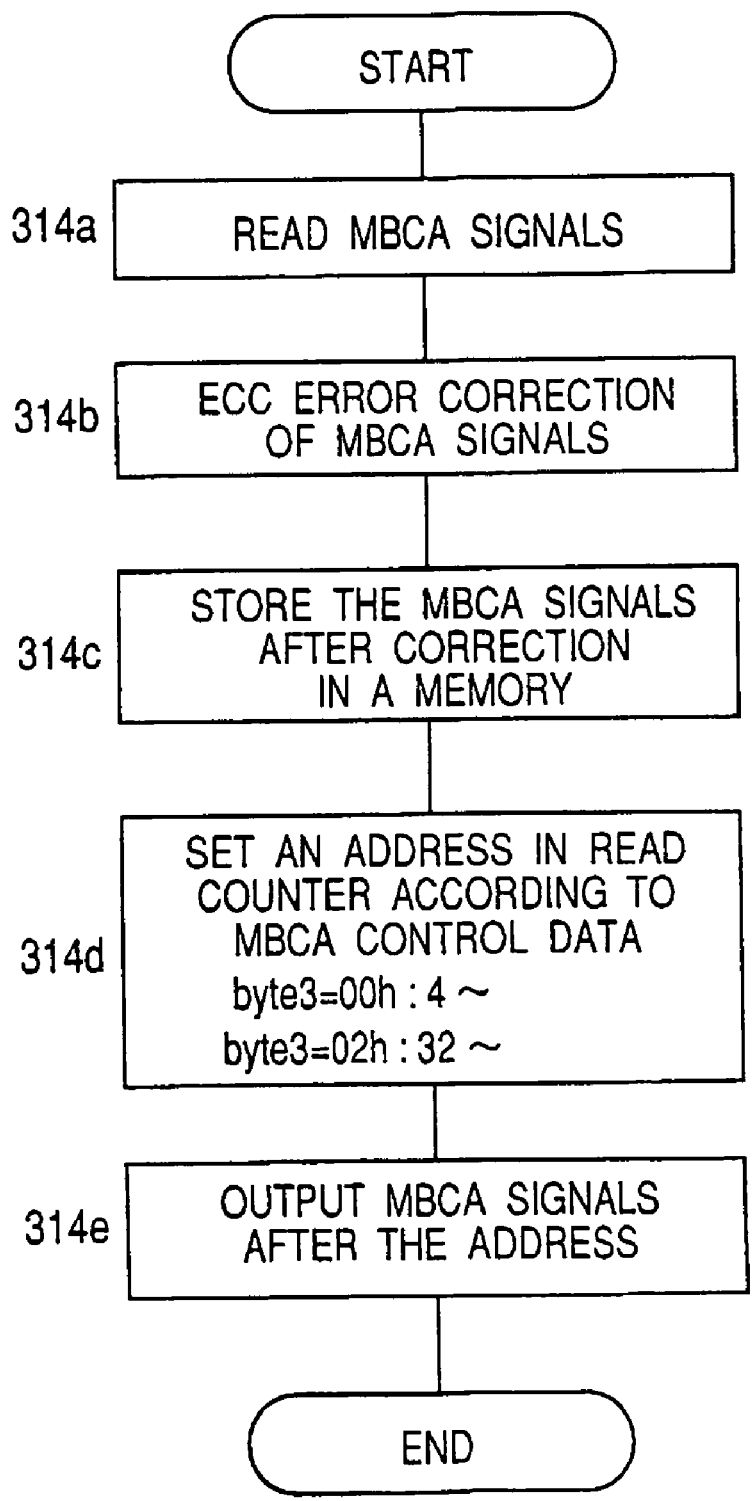
FIG. 13 is a flowchart of MBCA reproduction.

Next, demodulation for MBCA signals in the recording and reproducing apparatus is explained. As shown in FIG. 13, reproduction signals of MBCA are reproduced by PE-RZ demodulation in the second demodulator 530 (step 314a), and error code correction (ECC) is performed by an ECC decoder 530b (step 314b). Then, the result is stored in the second demodulator 530 (step 314c). An address counter is set for information of MBCA signals according to the control data 111 of MBCA (step 314d). In concrete, if byte 3 in the control data 111 is "00h", the read counter is set to 4, while if byte 3 in the control data 111 is "02h", the read counter is set to 32. Then, MBCA information at address in the read counter and thereafter is reproduced, and it is outputted from the BCA output section 550 through the interface, accompanying video information. As a result, a part of MBCA as additional information is outputted from the recording and reproducing apparatus, and it is processed only in the apparatus. The position of the address in the read counter can be expanded easily by setting the address at a different address.

Figure 14A:
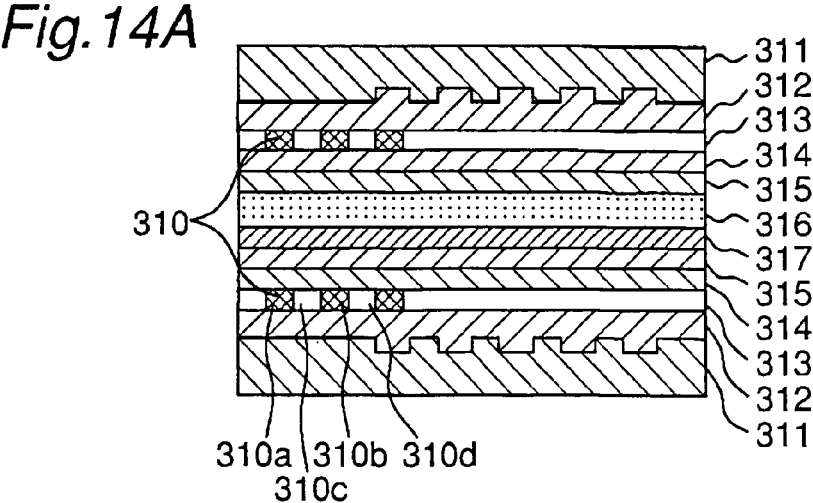
FIGS. 14A, 14B and 14C are a plan view of an optical disk of a second embodiment of the invention, a diagram of a waveform of signals of additional information on recording and on reproduction, and a plan view of another optical disk.
Figure 14B:
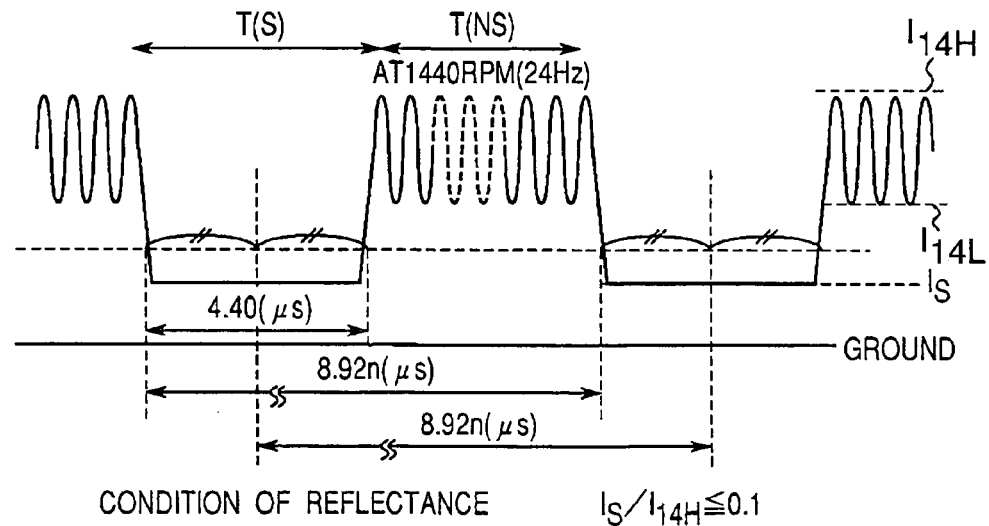

FIG. 14A is a sectional view for illustrating a structure of an optical disk of a second embodiment of the invention. A recording layer 313, made of a phase change material changeable reversibly between the crystalline and amorphous phases, is formed via a dielectric layer 312 on a disk substrate 311. Information can be recorded by using a difference in optical characteristics between the crystalline and amorphous phases due to reversible structural change in the atomic level, and it can be reproduced as a difference in the intensity of reflected or transmitting light at a predetermined wavelength. It is preferable that the difference of the reflected light between the two phase is equal to or higher than 10% in the area for recording the additional information, so that reproducing signals can be obtained surely from the additional information area. In a BCA in the recording layer 313, a plurality of BCAs 310a and 310b are formed along the disk circumferential direction. An intermediate dielectric layer 314 and a reflection layer 315 are layered successively on the recording layer 313, and an overcoat layer 316 is formed further thereon. Two disks, among which only the first one has the overcoat layer 316, are laminated with an adhesive layer 317. Alternatively, two optical disks having the same structure may be laminated with a hot melt process. As mentioned above, an optical disk has a recording layer of a thin film changing reversibly between two states which can be detected optically, and it can be applied to a DVD-RAM or the like as an exchangeable medium to which overwrite is possible at a high density. As the phase-change material, a GeSnTe alloy is used in the second embodiment. However, any material made of a material which changes optically between two states, such as an organic material, or a different material which changes the phase or a different material which changes the structure.

Figure 14C:
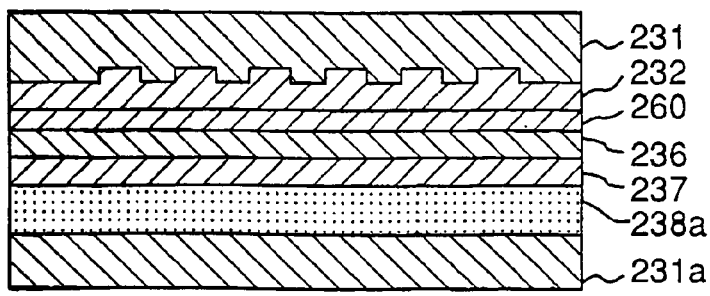

Further, FIG. 14C shows a different type of optical disk in contrast to the lamination type disk shown in FIG. 14A. A dielectric layer 232 is formed on a substrate 231, and a phase-change type recording layer 260 of thickness 10 nm is formed between the dielectric layer 232 of thickness 100 nm and an intermediate dielectric layer 236 of thickness 10 nm. Further, a reflection layer 237 is formed. As to a DVD-RAM or a DVD-RW, a substrate 231a and an adhesive layer 238a is added.

When BCA data are recorded in an optical disk having a recording layer made of a phase-change material changeable reversibly between the crystalline and amorphous phases according to radiation conditions of laser beam, barcode portions in the barcode-like pattern is made of the amorphous phase, while the remaining portions between the barcode portions are made of the crystalline phase.

When a recording layer is formed on a disk substrate, the recording layer of low reflectivity is formed first in the amorphous phase. Then, by irradiating the recording layer with a laser beam, portions between barcode portions are changed to crystalline phase having higher reflectivity and the remaining portions having the low reflectivity becomes the barcode portions.

On the other hand, in an optical disk such as DVD-ROM, by generating uneven pits of a reflection film, the main information may be recorded and the additional information different for each disk or ciphered additional information is recorded for output inhibition. If a disk identification (ID) to be inhibited to be outputted is recorded as the additional information without correlation between the disk ID and the ciphered additional information, it cannot be guessed from calculation based on disk ID. Therefore, it can be prevented that an illegal copier issues a new ID illegally.

When the main information is recorded by generating uneven pits in a reflection film, the additional information can be recorded by partially removing the reflection film.

Next, a method for producing the optical disk is explained. First, a disk substrate 311 having guide grooves or prepits for tracking guide is produced by using injection molding with a polycarbonate resin. Next, a dielectric layer 312 of $ZnSSiO_2$ film of thickness 80 nm is formed on the disk substrate 311 with radio frequency (RF) sputtering with a $ZnSSiO_2$ target in an argon environment. A recording layer 313 made of GeSbTe alloy of film thickness 10 nm is formed on the dielectric layer 312 by using RF sputtering with a GeSbTe alloy target in argon atmosphere. Next, an intermediate dielectric layer 314 made of $ZnSSiO_2$ thickness 10 nm is formed on the recording layer 313 with RF sputtering with a $ZnSSiO_2$ target in an argon environment. Next, a reflecting layer 315 made of AlCr film of thickness 40 nm is formed on the intermediate dielectric layer 314 with DC sputtering with an AlCr target in an argon atmosphere. Next, an ultra-violet-rays setting resin is applied to the reflecting layer 315 by dropping it on the reflecting layer 315 and by rotating it with a spin coater at a rotation speed of 3,500 rpm, and it is set with ultraviolet-rays to form an overcoat layer 316 of film thickness of 5 μm. Thus, a first optical disk is produced. On the other hand, a second optical disk is produced without forming the overcoat layer. Finally an adhesive layer 317 is formed by setting an adhesive with hot melt process. Then, the first and second optical disks are laminated to each other.

Information is recorded to information to the recording 313 made of Ge—Sb—Te alloy layer by irradiating a laser light condensed to a very small spot to cause a local change at the irradiate portion, that is, to generate a difference in optical characteristics based on reversible structure change in atomic level between the crystalline and amorphous phases. Further, the recorded information is reproduced by detecting a difference in the intensity of reflecting or transmitting light at a specified wavelength.

Next, recording of BCA signals to a phase-change type optical disk such as a DVD-ROM is explained. The recording film as shown in FIG. 14C is in the amorphous state called as as-deposited state. The as-deposited state usually has a low reflectivity, though it depends on the optical design of the film. This as-deposited state of phase-change type optical disk is crystallized when melted by irradiation with a laser beam and has a high reflectivity. Practically, after the as-deposited film is formed, an optical disk is irradiated on the whole plane to make the film crystallized or to have a high reflectivity, because information such as address and track necessary for recording is read easily if the film has a high reflectivity. This step is called as initialization. Then, the disk is delivered from the factory.

There are two processes for recording BCA signals in a phase-change type optical disk. In the first process, a region of crystalline phase is irradiated with a laser beam generated by a high output power laser diode such as a YAG laser, similarly to a magneto-optical recording medium. The temperature of a portion irradiated with the laser beam is increased, and the crystalline phase having a high reflectivity is changed to the amorphous phase having a low reflectivity. By increasing the laser power further, a part of the recording layer or the reflecting layer is melted or sublimed, so that the reflectivity of the irradiated portion becomes lower than the other portion. Thus, portions having the high reflectivity and other portions having the low reflectivity are formed. By using an optical head in a DVD drive, BCA reproduction signals as shown in FIG. 1C are reproduced.

In the second process, by providing inverted recording signals as shown in FIG. 1C, a laser beam does not irradiate the BCA stripe portions, so that the film is remained in the as-deposited film. On the other hand, the non-stripe portions are irradiated with the laser beam to be changed to the crystalline state or to have high reflectivity. Then, as shown in FIG. 1C, the reproduction signals has low signal levels at the BCA stripe portions. Thus, the steps are simplified in the second process because BCA signals can be recorded only by turning on or off the laser irradiation.

Figure 15:
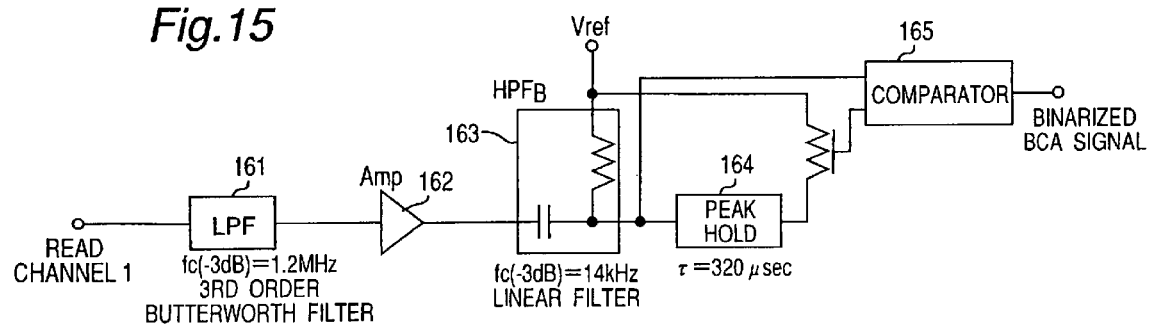
FIG. 15 is a diagram of a reproduction circuit for BCA data.
Figure 16A:
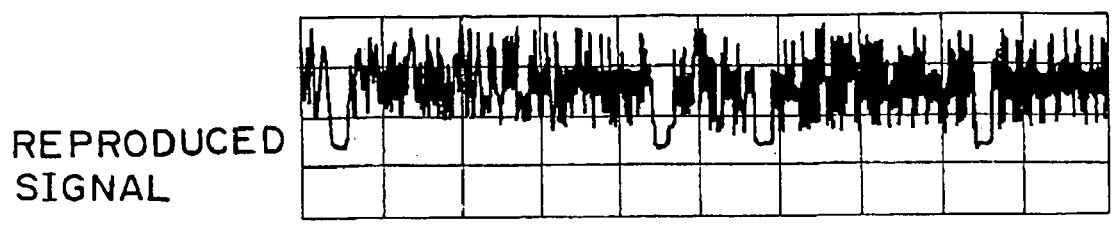
FIG. 16A, 16B and 16C are graphs of reproduction signal, converter input signal and binarized signal in the reproduction circuit.
Figure 16B:
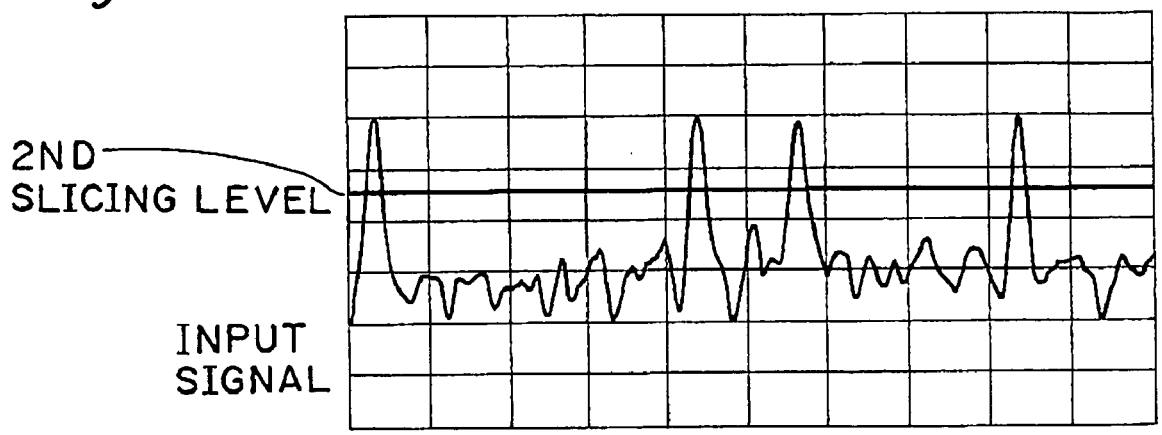
Figure 16C:
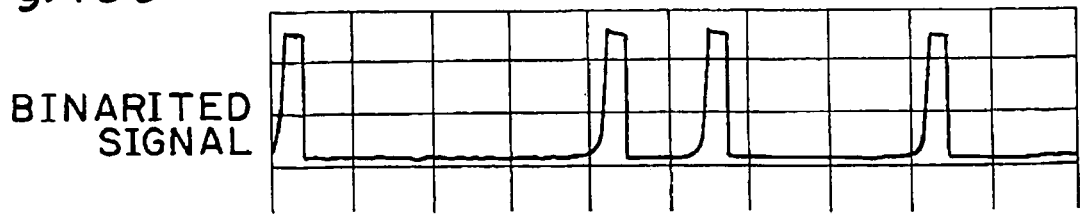

Next, the range of BCA signals acceptable for reproduction is explained. FIG. 15 shows a structure of a reproducing circuit of BCA signals. BCA signals are recorded with superposition on emboss pits. Therefore, as shown in FIG. 16A, the reproduction signals from the optical head has high frequency noises due to the emboss pits. The high frequency noises are removed by a low pass filter 161 of cut-off frequency fc of 1.2 MHz and amplified and inverted by an amplifier 162. Low frequency noises due to decentering are removed from the obtained signals by a high pass filter 163 of cut-off frequency fc of 14 kFz. A second slicing level is generated by having an average output of the peak values of BCA signals. A comparator 165 compares the reproduction signals of BCA signals with the second slicing level, as shown in FIG. 16B, and a binarized data as shown in FIG. 16C is outputted. Thus, the BCA signals are reproduced.

As mentioned above, the cut-off frequency fc of the low pass filter 161 is set to 1.2 MHz. FIG. 17 shows modulation noises when BCA signals are recorded in a phase-change type DVD-RAM disk. $IBM_{max}$ represents the maximum value or the worst value of the signal of BCA stripe mark portions after the LPF 161 for the reproduction signals shown in FIG. 16A, while $IBM_{min}$ represents the minimum value or the worst value of the signal of non-BCA stripe mark portions. Because, the slicing margin on reproduction needs to be 20% or higher, the reproducing apparatus cannot reproduce the BCA signals unless $IBM_{max}/IBM_{min}$ is equal to or smaller than 0.8. FIG. 17 shows measured values of $IBM_{max}/IBM_{min}$ when the cut-off frequency of the low-pass filter is changed. It is found that the ratio becomes equal to or smaller than 0.8 when the cut-off frequency is equal to or higher than 1.2 MHz. This condition has an advantage that the BCA signals can be stably reproduced.

A recording method of additional information in this embodiment is similar to that in the first embodiment explained above. That is, by using a high output power laser such as a YAG laser and a lens for converging in a direction such as a cylindrical lens, a laser light having a rectangular, stripe shape is converged on the recording layer 313 to form BCAs 310 along the disk circumferential direction in a plurality of areas. An optical disk according to the embodiment changes its structure due to excessive crystallization at phase transformation when irradiated with a laser light of an output power higher than on the recording of main information. Therefore, the BCAs 310a, 310b can be recorded irreversibly, and the recording film 313 is removed by irradiation at a still higher output power. Thus, it is preferable that the BCAs 310a and 310b can be recorded as an irreversible state of the crystalline state. By recording the BCAs 310a, 310b in this way, the intensity of reflecting light is changed between the BCAs 310a, 310b and the non-BCAs 310c, 310d. Therefore, the additional information can be reproduced by the optical head in a reproducing apparatus for a DVD-ROM. In this case, a change in the intensity of reflecting light from an optical disk is preferably 10% or higher. By making a change in average refractive index larger by 5% or more, the change in the intensity of reflecting light can be set to 10% or higher. In the case of DVD-RAM, similarly to DVD-ROM, by making a part of the protection layer or the reflection layer defective, it becomes possible to increase a change in the intensity of the reflecting light of the signals at the BCA region to a predetermined value or higher. There is no problem on reliability because the disk has an adhesive structure.

As explained above, the recording apparatus and the recording method of additional information in the second embodiment are similar to the counterparts in the first embodiment. However, only the magnetic anisotropy of the recording layer is changed in the first embodiment. On the other hand, because it is needed in this embodiment to change the intensity of reflecting light by a predetermined value or more, the recording power and the setting of recording conditions are different. Even when the recording power is set to the same as that for a magneto-optical disk, recording may be performed by using out-focus or by decreasing the recording power through a filter.

For a high density magneto-optical disk such as ASMO, additional information is reproduced by using the optical head 155 having the structure shown in FIG. 8. Therefore, the structure of the optical head, the detection of recording signals and reproduction conditions are different from the counterparts in this embodiment. However, by using the structure wherein an output inhibition area is provided in the additional information according to the invention, the copyright of the main information in a disk can be managed and protected strongly, by using procedures similar to those shown in the flowchart in the first embodiment.

As explained above, for an optical disk such as DVD-ROM or DVD-R, other than an overwrite type disk such as a magneto-optical disk or a DVD-RAM, by using the control data and the ciphered information inhibited to be outputted on reproduction in the additional information, an optical disk and a recording and reproducing apparatus therefor can protect files and prevent illegal copies by using the additional information.

Figure 18:
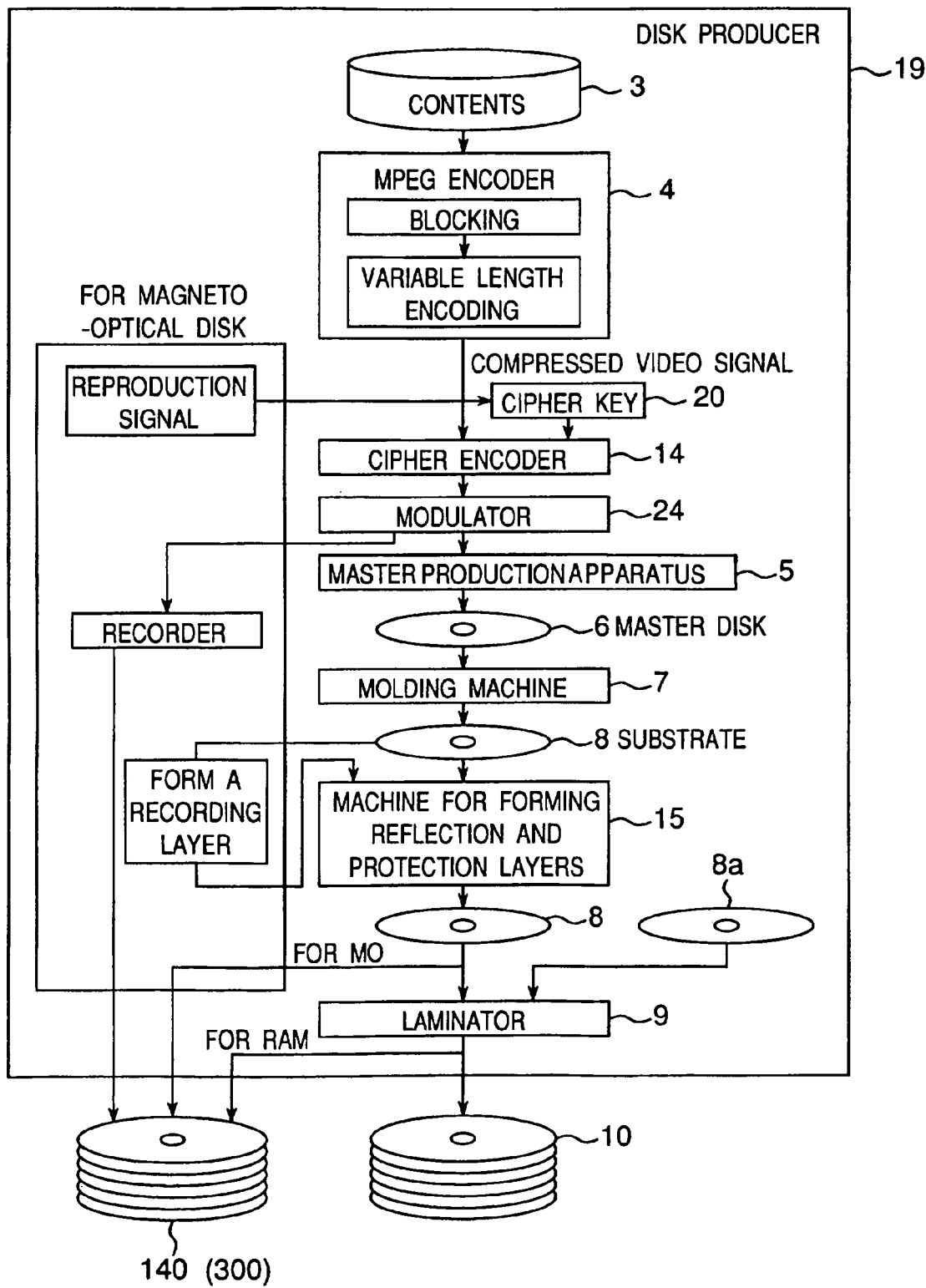
FIG. 18 is a block diagram of a disk production section in an apparatus for reproducing an optical disk.

Next, a means is explained for actually managing and protecting the contents by a contents provider. First, a production procedure is explained with reference to FIG. 18 until a disk having the contents is produced. In a disk production section 19, an MPEG encoder 4 divides original contents such as a moving picture into blocks and subjects them to variable-length coding. Thus, compressed video signals with compressed images with MPEG are generated. The signals are subjected to scrambling by a cipher encoder 14 with a cipher key 20 prepared with the BCA signals. The compressed video signals subjected to the scrambling are recorded as pit signals on a master disk 6 by a master production apparatus 5. By using a disk former 7 with the master disk 6, a large amount of disk substrates with recorded pits are produced. A reflection film made of aluminum or the like is formed thereon by an apparatus for forming the reflection layer. Then two disk substrates 8, 8a are laminated. Thus, a laminated disk 10 is completed. Further, for a magneto-optical disk, compressed video signals after scrambling are recorded as magneto-optical signals in the recording layer. For a disk of a single plate structure, a disk 140 is completed without adhesion. For a DVD-RAM 300, similarly, compressed video signals after scrambling are recorded in the recording layer, and two disks are laminated by an adhesive apparatus 300 to form a laminated disk. For a DVD-RAM 300, two disk structures are possible: single type having the recording layer only in a single side, and double type having the recording layer in the two sides. A DVD-R disk can also be fabricated similarly.

Figure 19:
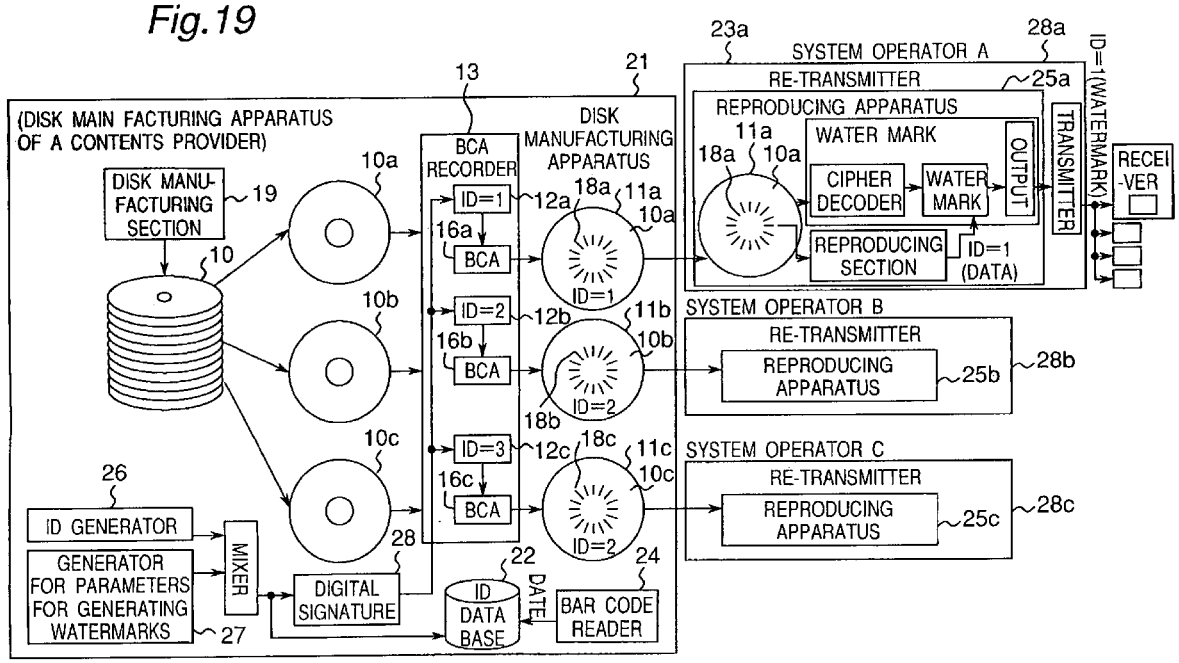
FIG. 19 is a block diagram of an apparatus for manufacturing a disk of a contents provider and a reproducing apparatus of a system operator.

Next, a method of reproduction of a disk by a contents provider is explained by recording additional information. FIG. 19 shows an apparatus for manufacturing disks and a reproducing apparatus therefor. A disk manufacturing section 19 produces a laminated disk or a single plate disk 10 of ROM or RAM type of the same contents. In a disk manufacturing apparatus 21, a BCA recorder 13 subjects BCA data 16a, 16b, 16c including an identification code 12a, 12b, 12c different for each disk PE modulation by a PE modulator 17 and performs laser trimming with a YAG laser to form BCAs 18a, 18b, 18c similar to circular barcodes on disks 10a, 10b, 10c, . . . The entire disk to which the BCA is recorded is referred to as BCA disk 11a, 11b, 11c. As shown in FIG. 13, the pit section or the recording signals are the same for these BCA disks 11a, 11b, 11c. However, for each disk, different IDs of 1, 2, 3 are ciphered in the BCA 18 as information inhibited to be outputted. A contents provider such as a movie company stores the different IDs in an ID database 22. At the same time, a barcode reader 24 which can read BCA when a directory is sent reads BCA data, and the location and the time of the supply of the disks are stored in the ID database. The location shows a particular system operator 23, such as a CATV company, a broadcasting station or an airline company, to which a disk with a particular ID is supplied. Thus, the ID database records when a disk with a particular ID is supplied to a particular system operator. Further, by setting the enciphered ID or the information to which the output is inhibited on reproduction, a BCA disk for a specified usage can be fabricated. Then, illegal copy can be prevented, and the BCA disk can be traced when a large amount of illegal copies are distributed.

A case where only contents are supplied in CATV or the like is explained above. However, contents can be protected similarly when a disk wherein BCA signals on recorded contents are recorded is sold. When a BCA disk of FIG. 19 is sold to a general user, a recording and reproducing apparatus having a similar structure to that of the first embodiment may be used. As shown in the flowchart in FIG. 10, ciphered ID information in the output inhibition area in the BCA disk is read, and a secret key is prepared in the apparatus, and a protected file is decoded, similarly to the recording and reproduction method of the first embodiment, so as to protect the copyright of the disk.

Further, the contents can be managed more surely if a secret key is provided through a communication line. That is, when a ciphered media ID or the like is reproduced, at step 301i in the flowchart in FIG. 10, reproduced information is sent through a communication line to the contents provider or a management agent of the software. Then, the contents provider decodes and verifies the cipher of the media ID information. When the disk is found to be a normal disk, information on the secret key is provided to dissolve scrambling of the contents. By using the information on the secret key, the protected file of the contents is decoded for reproduction (step 301l). In this case, additional information inherent to each contents such as disk ID can always be managed, and illegal use of additional information can be discovered easily.

If a media identification (ID) is ciphered so that the disk ID does not completely correlate to the cipher method as recorded in a BCA, it cannot be guessed with a calculation from the ID. That is, only the copyright owner knows the relationship between the ID and the ciphering calculation. Therefore, it is prevented that a person for producing an illegal copy issues a new ID or a ciphered information thereof illegally.

Further, for ciphering, spectrum signals can be generated from information inherent to a user such as card ID for IC card and added to the ID signal 38 in the disk. In this case, both of media ID and user's personal information are needed to be verified, and it becomes more difficult to issue illegal ID information. Further, because a person having a copyright can confirm both of a distributed ID of the software and an ID of the reproducing apparatus, an illegal copy can be traced more easily.

Figure 20:
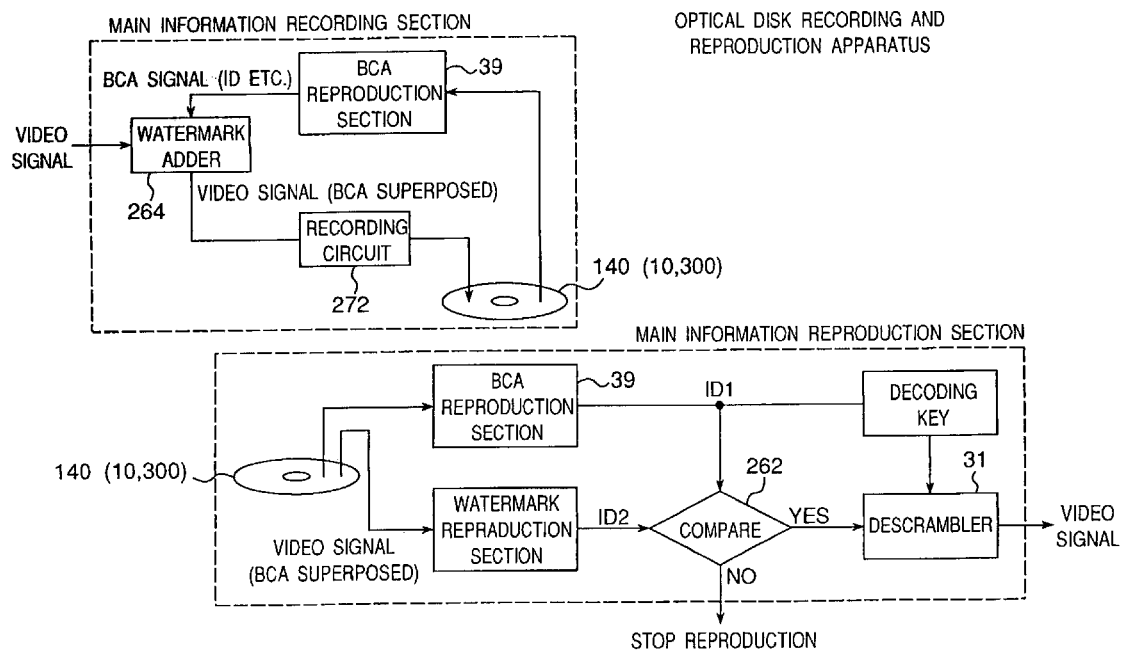
FIG. 20 is a block diagram of a recording and reproducing apparatus for an optical disk.

As shown in a recording section in a recording and reproducing apparatus shown in FIG. 20, when main information such as video signals or the like is recorded in a disk 140 which records BCA, first, BCA signals including a disk identification (ID) inherent to each optical disk are read by the BCA reproduction section 39, and signals generated from BCA signals in the additional information are superposed as watermarks to convert the video signals, and the converted video signals are recorded in a BCA disk 140 (10, 300). A watermark is generated, for example, based on the disk ID. When video signals are reproduced from a BCA disk 140 (10, 300) which records the video signals superposed with the BCA signals, the BCA signals are first read by the BCA reproducing section 39 and detected as ID1 of the disk to be used for generating a secret key. In the method for generating a secret key, the key is verified and supplied in a recording and reproducing apparatus. The verification, generation and supply of a secret key may be performed through a communication line by a system operator or a person who manages a software.

Next, information inherent to an optical disk superposed with video signals is detected as disk ID2 by a watermark reproducing section which decodes the watermark. A secret key generated from the BCA signals, ID1, is compared with disk ID2 read from the superposed signals of the video signals, and if they do not agree with each other, the reproduction of video signals is stopped. As a result, video signals cannot be reproduced from a disk wherein signals different from the hidden information in the BCA signals are superposed. On the other hand, when they agree with each other, by using a decoded key including ID information read from the BCA signals, video signals superposed with watermarks are descrambled by a descrambler 31 and outputted as video signals.

When video signals are sent through a communication line by a method explained above, a BCA video disk 10a, 10b, 10c including BCA information ciphered by a disk production apparatus 21 shown in FIG. 19 is sent to a reproducing apparatus 25a, 25b, 25c of a system operator 23a, 23b, 23c.

Figure 22A:
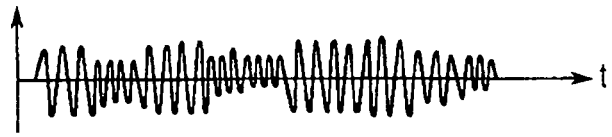
FIGS. 22A–22H are diagrams of waveforms in time axis and in frequency axis of original signals and image signals.
Figure 22B:
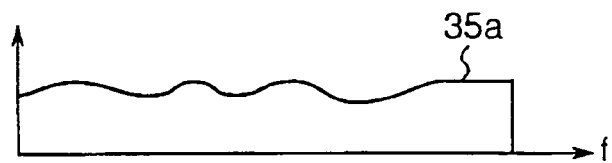
Figure 22C:
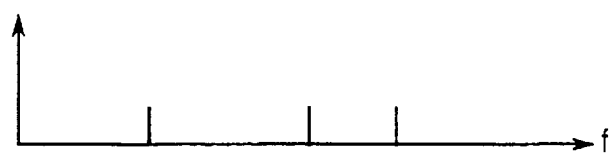
Figure 22D:
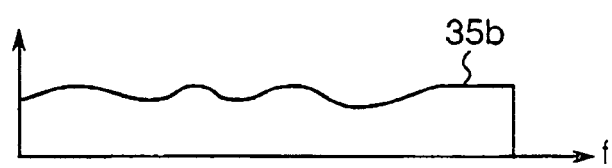
Figure 22E:
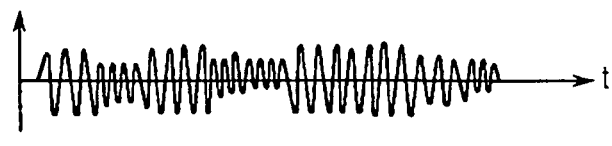
Figure 22F:
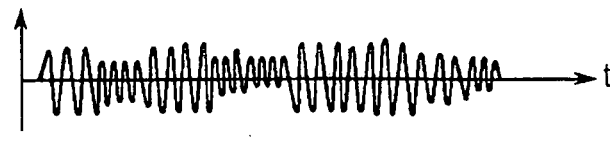

The operation for a system operator is explained with reference to FIG. 21, which shows a re-transmitter in detail. Further, FIGS. 22A–22H illustrate waveforms in time axis and in frequency axis of the original signals and each video signals. As shown in FIG. 21, a reproducing apparatus 25a exclusive for a system operator is provided in a re-transmitter 28 provided in a CATV station or the like, and a BCA disk 11a supplied from a movie company or the like is set to the reproducing apparatus. Main information in the reproduced signals by the optical head 29 is reproduced by a data reproduction section 30, and descrambled by a descrambler 31, the original video signals are extended by an MPEG decoder 33 to be sent to a watermark section 34. In the watermark section 34, the original signal shown in FIG. 22A are received and converted by a frequency converter such as a fast Fourier transform (FFT) from time axis to frequency axis. Thus, a frequency spectrum 35a as shown in FIG. 22B is obtained. The frequency spectrum 35a is mixed by a spectrum mixer 36 with an ID signal which has a spectrum shown in FIG. 22C. As shown in FIG. 22D, the spectrum 35b of the mixed signals is not different from the frequency spectrum 35a of the original signals shown in FIG. 22B. That is, the ID signal is subjected to spectrum dispersion. The signal is converted by an inverse frequency converter 37 such as IFFT from frequency axis to time axis, and signals shown in FIG. 22E not different from the original signals (FIG. 22A) are obtained. Because of spectrum dispersion of the ID signal in frequency spectrum, and deterioration of video signals is small.

In the apparatus shown in FIG. 21, video output signals from the watermark section 34 are sent to an output section 42. When a re-transmitter 28 sends compressed video signals, an MPEG encoder 43 compresses the video signals and a scrambler 45 scrambles them with a cipher key inherent to the system operator and a transmitter 46 sends the scrambled signals through a network or radio communication to an audience. In this case, information 47 on compression parameters such as transmission rate after compression to the MPEG signals is sent from an MPEG decoder 33 to the MPEG encoder 43. Therefore, the compression efficiency is improved in real-time encoding. Further, because audio signals and compressed audio signals 48 bypass the watermark section 34, they are not expanded or compressed, and they are not deteriorated. When the compressed signals are not transmitted, as-scrambled video output signals 49 are transmitted by a transmitter 46a. For a screen in an airplane or the like, scrambling is not necessary. Thus, video signals including watermarks are transmitted from a disk 11.

In the apparatus shown in FIG. 21, an illegal copier may take out video signals from a bus between blocks or by bypassing the watermark section 34. In order to prevent this copying, buses between the descrambler 31, the MPEG decoder 33 and the watermark section 34 are ciphered with a shake-hand scheme by the mutual authentication sections 32a, 32b, 32c and 32d provided therein. Signals ciphered by the mutual authentication section 32c at the transmission side are received by the mutual authentication section 32d at the receive side, while the two mutual authentication sections 32c and 32d communicate or shake-hand with each other. Only when the result of mutual authentication is correct, the mutual authentication section 32d at the receive side deciphers the cipher signals. The situation is similar for the other mutual authentication sections 32a and 32b. Therefore, in the embodiment, the ciphers cannot be deciphered as long as the mutual authentication is not performed. Therefore, even if digital signals are taken out at an intermediate bus, the cipher signals are not deciphered, and the watermark section 34 are not eventually bypassed. Thus, illegal elimination or interpolation of watermarks can be prevented.

Now, a method is explained for generating signals 38 on the ID information. The BCA data reproduced by a BCA reproduction section from a BCA disk 11a are verified on signature with a public key sent from the BCA disk 11a or the like by a digital signature verifier 40. If the verification is not good (NG), the operation is stopped. If OK, because the data are not interpolated, the ID itself is sent to a watermark data generator 41a. Then, by using ciphered information signals included in BCA data, watermark signals are generated in correspondence to ID signal shown in FIG. 22C. However, the additional information is not outputted outside the drive in a recording and reproducing apparatus, the signals cannot be processed or interpolated. A signal of a secret key may be generated by calculation from an ID data or a card ID in an IC card 41.

Figure 23:
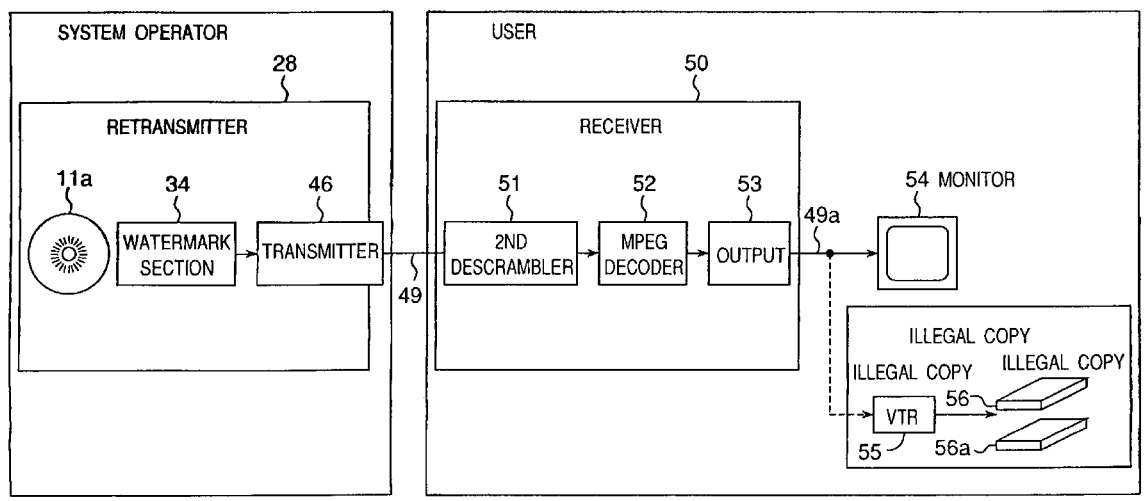
FIG. 23 is a block diagram of a receiver of a user and a transmitter of a system operator.

As shown in FIG. 23, for illegal copy, video signals 49a are recorded in video tapes 56 by a video cassette recorder 55, and a large amount of video tapes 56 of illegal copies are distributed, and the copyright is violated. However, by using BCAs of the invention, the video signals 49a and video signals 49b reproduced from a video tape 56 (refer to FIG. 24) have superposed watermarks. Because the watermarks are added in the frequency spectrum, they cannot be vanished easily. They are not vanished through an ordinary recording and reproduction system.

Figure 22G:
Figure 22H:
Figure 24:
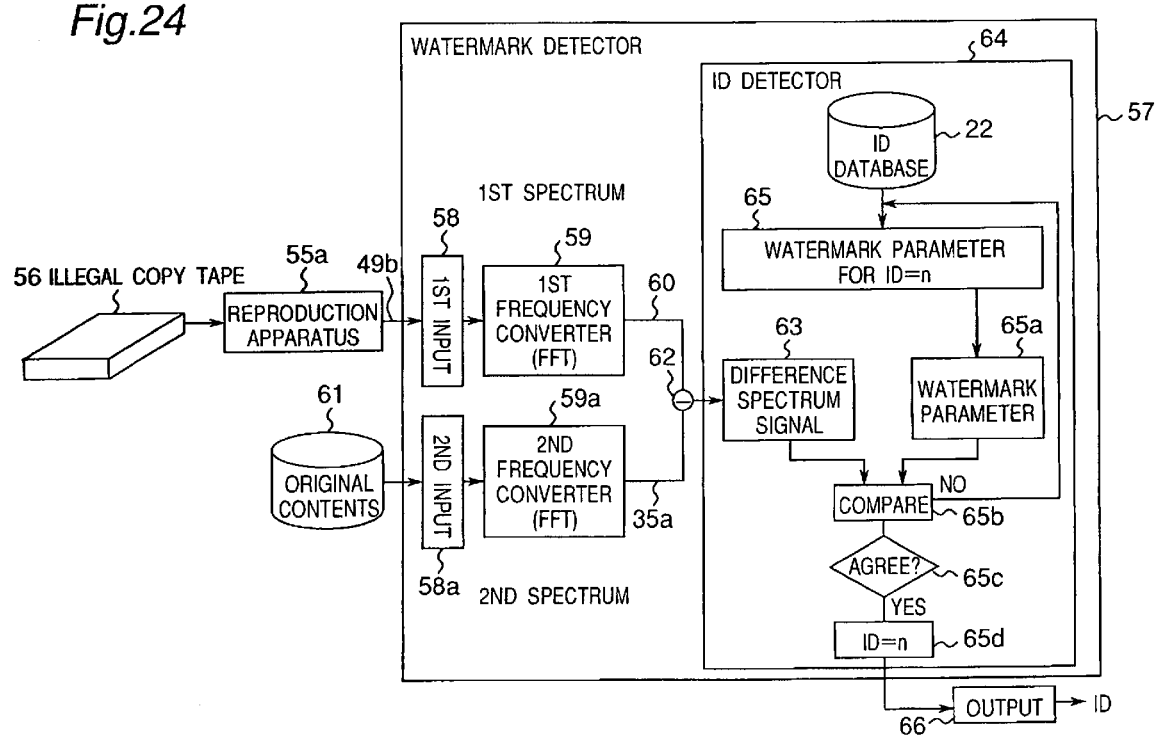
FIG. 24 is a block diagram of a watermark detector of an optical disk.

A method for detecting watermarks is explained with reference to FIG. 24. An illegal copy of a medium such as a video tape, a DVD or a laser disk is reproduced by an apparatus 55a such as a video cassette recorder or a DVD player, and the reproduced video signals 49b are received by a first input section in a watermark detector 57. Then, with a first frequency spectrum converter 59 such as FFT or discrete cosine transform (DCT), a first spectrum 60 as a frequency spectrum of signals of illegal copy is obtained as shown in FIG. 22G. On the other hand, the original contents 61 are received by a second input section 58a and converted to frequency axis by a second frequency converter 59a to provide a second spectrum 35a as shown in FIG. 22B. By obtaining a difference between the first spectrum 60 and the second one 35a with a difference calculator 62, a difference spectrum signal 63 as shown in FIG. 22H is obtained. The difference spectrum signal 63 is sent to an ID detector 64. In the ID detector 64, a watermark parameter of ID=n is taken out from an ID database 22 (step 65) and received (step 65a), and the spectrum signals based on the watermark parameter are compared with the difference spectrum signals 63 (step 65b). Next, it is decided whether the spectrum signals based on the watermark parameter agree with the difference spectrum signals 63 (step 65c). If they agree with each other, it is decided that ID=n (step 65d). If they do not agree with each other, ID is changed to (n+1), and a watermark parameter of ID=(n+1) is taken out from the ID database 22, and the above steps are repeated, and the ID of watermarks is detected. If the ID is correct, the spectrum of the original signals and that of the above-mentioned difference agree with each other as shown in FIGS. 22C and 22H. Then, the ID of watermarks is outputted from an output section 66, and a source of the illegal copy becomes clear. By identifying the ID of watermarks as explained above, the source of contents of pirate disks and illegal copies can be traced, and the copyright is protected. In this embodiment the watermark portion in the spectrum dispersion is used, but similar advantages can also be obtained by other watermark methods.

In cases of a RAM disk 140a such as a DVD-RAM 300 or a magneto-optical disk 140, a contents provider such as a CATV station having a DVD recording and reproducing apparatus or a magneto-optical recording and reproducing apparatus, as shown in FIG. 7, sends ciphered scrambled data through a communication line to another recording and reproducing apparatus of a user with a ciphered ID number of BCA as a key, and the scrambled data are recorded once in a RAM disk 140a or a phase-change type RAM in a CATV station or the like.

In a simplified system, ciphering or scrambling is performed in a recording and reproducing apparatus of a user. This is explained briefly. In this case, the recording and reproducing apparatus shown in FIG. 7 is operated variously according to the level of copyright protection for the input signals. For the level of copyright protection, three types of identifiers, that is, copy free, copy once and never copy, are mixed with data or watermarks. For copy free, one generation copy is allowed, and for never copy, copying is inhibited. The three types of identifiers are discriminated by detecting watermarks of input signals by the watermark reproducing section 263. In the case of copy free identifier, recording is performed without scrambling. In the case of never copy identifier, the recording inhibition section 265 is operated to stop recording. In the case of copy once identifier, the unique disk identification (ID) is read from the BCA, and the input signals are scrambled with the disk ID to be recorded in the RAM disk. The recording is explained below.

First, BCA data are reproduced from the optical disk 140a with the optical head 29, and they are processed by the PE-RZ demodulator 530a and the ECC decoder 530b. The obtained BCA data are sent by a BCA output section 550. A unique disk ID of say 64 bits (8 bytes) is included in the BCA data of 188 bytes, and the disk ID is outputted.

When input signals are recorded in copy once mode, a scrambler 271 in a recording circuit scrambles the MPEG video signals by using the disk ID as one of keys. A recorder 272 including a recording circuit converts the scrambled video data to record signals for recording in a RAM disk 140a with an optical head 29.

When reproduction is performed on the RAM disk 140a or the phase-change type RAM to which the scrambled signals are recorded, it is a legitimate use. As shown in FIG. 7, the BCA is read, and a secret key is generated from the ciphered BCA data obtained from a BCA output section 550, and the data are descrambled by a descrambler or a cipher decoder 534a by using the unique disk ID in the BCA data or the secret key as a key. Then, MPEG signals are expanded by an MPEG decoder 261 to provide video signals. However, when the scrambled data in the RAM disk 140a recorded normally are copied in a different RAM disk 140b, that is, when the disk is used illegally, the BCA data of the disk are different on reproduction, and a correct key cannot be obtained for canceling the scrambled data. Therefore, the cipher decoder 534a cannot correctly descramble the data. Thus, video signals cannot be obtained. Because signals copied in the second disk or disks in the second or subsequent generations of RAM disk cannot be reproduced, the copyright of the copy once contents added with the watermarks is protected. As a result, the contents are recorded or reproduced only from the RAM disk 140a. In the case of the DVD-RAM shown in FIG. 14A or 14C, recording and reproduction are possible for the one DVD-RAM disk similarly. Because the ciphered BCA signals are not outputted from the recording and reproducing apparatus by ciphering the BCAs, it is impossible to extract only the BCA data to read or change the secret key.

In order to more strongly protect the software, first, BCA data in the RAM disk 140a of a user are sent through a communication line to a contents provider. Next, at the contents provider, the BCA data are converted to watermarks in a watermark recorder 264, and video signals are embedded and transmitted. At the user, the signals are recorded in a RAM disk 140a. On reproduction, at a watermark reproduction and identification section 262, BCA data or the like of a recording permission identifier and watermarks are compared with the counterpart obtained by a BCA output section 550. Only if they agree with each other, the reproduction is permitted. Thus, the copyright is protected more strongly. In this method, even when a digital/analog copy is performed directly from the magneto-optical disk 140a to a VCR tape, the watermarks are detected by a watermark reproduction section 263, so that illegal digital copy can be prevented or detected. In the case of a DVD-RAM 300a shown in FIG. 7, illegal digital copy can be prevented or detected similarly.

By providing the watermark reproduction section 263 in a magneto-optical recording and reproducing apparatus or a DVD recording and reproducing apparatus to add ciphered information of "once recordable identifier" to the signals received from the contents provider, the software can be protected more strongly. Further, if recording is allowed by a recording prevention section 265, the recording to a second disk or an illegal copy is prevented by the recording prevention section 265 and a "once recorded identifier".

It is also possible to generate watermarks by a watermark recorder 264 on the identifier of "once recorded", and an individual disk number of a magneto-optical disk 140a recorded beforehand in the BCA recorder 120 and to superpose the watermarks to the recording signals to be recorded in the RAM disk 140a.

Further, it is also possible that a time information input section 269 adds date information permitted by a system operator in a rental shop or the like, as the additional information, to a key of the watermarks or scrambled data and gives it to the scrambler 271. It is also possible to use a synthesized key as a password. When the reproducing apparatus reproduces and checks the date information from the password 271a or from the BCA data and watermarks, it is possible to limit a period when the scrambling key can be cancelled, such as "enable time of three days". Because the additional information is not outputted from a reproducing apparatus, this can be applied to a rental disk system including time information. In this case, the copy is prevented, the copyright is protected surely, and an illegal use is very difficult.

Further as shown in a recording circuit 266 shown in FIG. 7, BCA data are used in a part of a cipher key of scrambling, and BCA data are used for the additional information ciphered primarily and for the additional information ciphered secondarily. Then, the watermark reproduction section 263 checks the both. Then, an illegal copy can be prevented more strongly.

As explained above, in an overwrite optical disk such as a magneto-optical disk used in ASMO or a DVD-RAM, by using inherent information in the additional information of the invention which cannot be outputted, the copyright can be protected more strongly by using watermarks and scrambling.

Further, as to the additional information, the DVD disk and the magneto-optical disk can be provided to be common on the format of information signals and the like. Then, according the reproduction procedure of the additional information shown in the flowchart in FIGS. 10A and 10B, as far as the optical disk is a compatible disk, the contents can be protected and managed commonly irrespective of the type of the optical disk by a recording and reproducing apparatus having the same structure. Therefore, an optical disk and a recording and reproducing apparatus therefor has high reliability on the copyright protection.

Further, an accounting system for each contents such as pay-per-view of video information can be realized in this embodiment by combining the transmission of additional information inhibited to be outputted for each software or contents, information on a secret key from the contents provider, in combination with a pay method of a fee from an IC card. Further, an accounting system on the use of contents can be set for each optical disk, by using the additional information inhibited to be outputted of the invention.

Further, in a recording and reproducing apparatus for a write once optical disk or an overwrite optical disk including the additional information inhibited to be outputted, data file of information managed personally are ciphered, or data file in a system in a company is ciphered with individual information of an employer. Then, an access right to each optical disk can be set which is used for personal data or for data file of information in a company. Therefore, a system is provided where security of information protected except specified uses, such as information on personal privacy, can be enhanced. It is very difficult to externally access the data file managed and protected as mentioned above.

Further, in a system where ciphered BCA information and a secret key are combined in the additional information of the invention, when the same signals are recorded by superposition in a ROM disk or a RAM disk. Then, virtual watermarks can be realized. As a result, by using the optical disk and the reproducing apparatus according to the invention; video signals outputted from the reproducing apparatus are all embedded with watermarks in correspondence to ID information issued by a contents provider. In contrast to a prior art method of managing information for each disk, the disk cost and the disk production time can be reduced to a large extent.

In the above embodiments, a DVD-ROM disk or a DVD-RAM disk of two-plates lamination type or an optical disk of a single plate type is used for explanation. However, according to the invention, the same advantages can be obtained generally over disks irrespective of the structure of the disk. That is, in different ROM disks, RAM disks or DVD-R disks and magneto-optical disks, similar advantage can be obtained by reading the explanation with DVD-R disk, DVD-RAM disk or magneto-optical disk. However, the explanation is omitted.

In the above embodiments, a magneto-optical disk having a recording layer of a three-layer structure of CAD type is used in the explanation. However, it may also be applied to a magneto-optical disk of FAD type, RAD type or double mask type where reproduction is possible with magnetic super-resolution, a prior art magneto-optical disk, or a magneto-optical disk for reproducing data by enlarging recording magnetic domains. Further, for a prior art optical disk, a DVD-ROM, a DVD-RAM, a DVD-R, or a disk having a structure for reading information in a recording layer consisting of two or more layers from one side for higher recording density, by using the disk structure of additional information and the recording and reproduction method explained above, the management information for software in an optical disk can be recorded easily to the additional information. Then, a superior optical disk can be provided where a copy of the contents can be prevented.

The above-mentioned embodiments are explained on optical disks. However, the invention can also be applied to different recording media such as a magnetic tape, an optical tape, a magnetic disk, an optical card, a magnetic card and a semiconductor memory device, and it is obvious that they are to be understood as included within the scope of the present invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disk for use with at least one of a recording apparatus and a reproducing apparatus, said optical disk having at least a recording layer for recording information, said optical disk comprising:

a first recording area for recording contents data and data for recording and reproducing the contents data; and a second recording area for recording secondary data related to the contents data;

wherein said second recording area comprises a first section for recording control data and a second section for recording data not to be inhibited from being outputted from the reproducing apparatus, and wherein the control data includes an identifier indicating whether said second recording area further includes a third section for recording data to be inhibited from being outputted from the reproducing apparatus.

2. The optical disk according to claim 1, wherein data recorded in the second recording area are stripe marks longer in radial direction and cannot be overwritten after they are written once.

3. The optical disk according to claim 1, wherein the data for recording and reproducing the contents data in said first recording area include an identifier which shows whether information is recorded in said second recording area.

4. The optical disk according to claim 1, wherein an identifier which shows whether information that is recorded in said second recording area is recorded in said first section in said second recording area.

5. The optical disk according to claim 1, wherein the data for recording and reproducing the contents data in said first recording area include an identifier which shows whether information is recorded additionally in said second recording area and an amount of recorded data in said second recording area.

6. The optical disk according to claim 1, wherein ciphered data are recorded in said third section in said second recording area.

7. The optical disk according to claim 1, wherein a disk identifier different for each optical disk is recorded in said second recording area.

8. The optical disk according to claim 1, wherein said second recording area is provided at a predetermined area in an inner peripheral section or an outer peripheral section in the disk.

9. The optical disk according to claim 1, wherein data of said first recording area comprises data stored in the recording layer as uneven pits in a reflection film, and
   wherein data of said first recording area comprises partially removed stripe marks, of said reflection film, longer in the radial direction.

10. The optical disk according to claim 1, wherein said first recording area includes an area to which information can be written.

11. The optical disk according to claim 10, wherein said first recording area has a recording layer to which data can be recorded with an optical device.

12. The optical disk according to claim 11, wherein said first recording area has said recording layer to which data can be recorded with an optical device a plurality of times.

13. The optical disk according to claim 10, further comprising a recording layer including an organic layer changeable between two states that are optically detectable.

14. The optical disk according to claim 12, wherein said recording layer comprises a magnetic layer having perpendicular magnetic anisotropy in a film normal direction.

15. The optical disk according to claim 14, wherein said second recording area comprises barcode portions and portions between the barcode portions having smaller perpendicular magnetic anisotropy along film normal direction than said barcode portions.

16. The optical disk according to claim 12, wherein said recording layer comprises a plurality of layered magnetic films.

17. The optical disk according to claim 10, further comprising a recording layer made of Ge—Sb—Te alloy.

18. The optical disk according to claim 10, further comprising a recording layer including a film reversibly changeable between two optically detectable states,
   wherein an amount of reflection light from said first recording area is different from than from said second recording area.

19. The optical disk according to claim 18, wherein said recording layer is reversibly changeable between crystalline and amorphous states according to conditions of a light for illuminating said recording layer.

20. The optical disk according to claim 19, wherein said recording layer comprises barcode portions made of an amorphous state and portions between the barcode portions made of a crystalline state.

21. The optical disk according to claim 19, wherein said recording layer comprises barcode portions, and nonbarcode portions between the barcode portions having a higher reflectivity than the barcode portions.

22. The optical disk according to claim 1, wherein the data to be inhibited from being outputted from the reproducing apparatus includes data on an identity of the optical disk.

23. A reproducing method for reproducing contents from an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from at least one of a recording apparatus and a reproducing apparatus, said reproducing method comprising:
   reproducing data from the second recording area before reproducing data from the first recording area;
   deciding, based on an identifier in the control data, whether the second recording area comprises a third section for recording data to be inhibited from being externally outputted from the reproducing apparatus; and
   processing the data to be inhibited from being outputted only in the reproducing apparatus when the data reproduced from the second recording area are determined to include the data to be inhibited from being outputted, without outputting the data to be inhibited from being outputted,
   wherein the identifier indicates whether the second recording area further includes the third section for recording the data to be inhibited from being outputted from the reproducing apparatus.

24. The method according to claim 23, wherein data are reproduced from the first recording area according to reproduction conditions included in the data to be inhibited from being outputted when the data reproduced from the second recording area are determined to include the data to be inhibited from being outputted.

25. The method according to claim 23, further comprising:
   reproducing data from the first recording area; and
   detecting a second identifier which shows whether data exist in the second recording area, in the data reproduced from the first recording area;
   wherein said reproducing data from the second recording area is performed only when the second identifier is detected.

26. The method according to claim 23, wherein when the data reproduced from the second recording area are determined to include the data to be inhibited from being outputted, identification is performed by using data reproduced from the second recording area, and only when restriction on the output of the data in the first recording area is canceled, reproduced signals of data recorded in the first recording area are deciphered and decoded.

27. The method according to claim 23, wherein when the data reproduced from the second recording area are determined to include the data to be inhibited from being outputted, information signals are generated based on the data, and the contents data are superposed and outputted with the information signals.

28. A reproducing apparatus for reproducing contents from an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from said reproducing apparatus, said reproducing apparatus comprising:

an optical head operable to reproduce information from the optical disk with an optical spot;

a first reproducing section operable to reproduce data with said optical head from the first recording area; and a second reproducing section operable to reproduce data with said optical head from the second recording area, wherein the control data includes an identifier indicating whether the second recording area further includes a third section for recording data to be inhibited from being outputted from said reproducing apparatus, and wherein when data to be inhibited from being outputted are recorded in the third section, said second reproducing section processes the data in the third section but does not output the data in the third section.

29. The apparatus according to claim 28, further comprising:

a detector operable to detect a second identifier, which shows whether information is recorded in the second recording area in the optical disk, from reproduced signals by said first reproducing section; and a controller operable to move said optical head to the second recording area when said detector detects the second identifier, reproduces control data from the second recording area by said second reproducing section, and decides according to the identifier in the control data whether the data to be inhibited from being outputted are included.

30. The apparatus according to claim 28, wherein said second reproducing section reproduces data in the second recording area according to a detection signal received by a photodetector provided in said optical head or a sum of detection signals received by a plurality of photodetectors provided in said optical head.

31. The apparatus according to claim 28, further comprising a second detector operable to detect whether a protective safety mode is set for the data in the first recording area in the optical disk, from reproduced signals from the second recording area by the second reproducing section, wherein when the setting of the protective safety mode is detected by said second detector, said first reproducing section performs identification by using data reproduced from the second recording area, and only when restriction on the output of the data in the first recording area is canceled, reproduced signals of data recorded in the first recording area are deciphered and decoded.

32. The apparatus according to claim 28, wherein the data to be inhibited to be outputted include a disk identification different for each optical disk.

33. The apparatus according to claim 28, further comprising a key generator operable to generate a secret key for decoding the contents data in the first recording area by using a ciphered disk identification included in the second recording area.

34. The apparatus according to claim 33, wherein said second reproducing section is operable to perform verification by using the secret key generated by said key generator and deciphering and decoding for the contents data in the first recording area.

35. The apparatus according to claim 28, further comprising:

a third reproducing section operable to decode ciphered data recorded in the second recording area in the optical disk and reproduced by said second reproducing section;

a cipher decoder operable to decode signals reproduced from the first recording area by said first reproducing section;

a first mutual authentication section provided in said third reproducing section; and a second mutual authentication section provided in said cipher decoder;

wherein only when said first and second mutual authentication sections authenticate mutually, the ciphers reproduced from the first recording area are deciphered.

36. The apparatus according to claim 28, wherein said second reproducing section is operable to reproduce ciphered data to be inhibited from being outputted, and wherein said apparatus further comprises a transmission section operable to transmit the ciphered data reproduced by said second reproducing section and plaintext data reproduced from the second recording area through a connection line to an external apparatus.

37. A reproducing apparatus for reproducing contents from an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from said reproducing apparatus, said reproducing apparatus comprising:

an optical head operable to reproduce information from the optical disk with an optical spot;

a first reproducing section operable to reproduce data with said optical head from the first recording area; and a second reproducing section is operable to reproduce data with said optical head from the second recording area;

wherein the control data includes an identifier indicating whether the second recording area further includes a third section for recording data to be inhibited from being outputted from said reproducing apparatus, and wherein said second reproducing section is further operable to generate information signals based on the data to be inhibited from being outputted that is recorded in the third section, and said first reproducing section is further operable to superpose the information signals to signals reproduced from the first recording area and to output the superposed signals.

38. The apparatus according to claim 37, further comprising:

a third reproducing section operable to reproduce the superposed signals generated by said second reproducing section;

a cipher decoder operable to decode signals reproduced from the first recording area by said first reproducing section;

a first mutual authentication section provided in said third reproducing section; and a second mutual authentication section provided in said cipher decoder;

wherein only when said first and second mutual authentication sections authenticate identification mutually, the ciphers reproduced from the first recording area are deciphered.

39. The apparatus according to claim 37, wherein said second reproducing section is operable to reproduce ciphered data to be inhibited from being outputted, and wherein said apparatus further comprises a transmission section operable to transmit the ciphered data reproduced by said second reproducing section and plaintext data reproduced from the second recording area through a connection line to an external apparatus.

40. A recording and reproducing apparatus for recording and reproducing contents from an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from said recording and reproducing apparatus, said recording and reproducing apparatus comprising:

a generator operable to generate information signals based on data inherent to the optical disk; and a recorder operable to superpose the generated information signals with predetermined signals and to record the superposed signals to the first recording area or add them to the second recording area, wherein the control data includes an identifier indicating whether the second recording area further includes a third section for recording data to be inhibited from being outputted from said recording and reproducing apparatus, and wherein the data inherent to the optical disk are recorded in the third section.

41. The recording and reproducing apparatus according to claim 40, wherein the signals to be superposed are watermarks generated by using a disk identification recorded in the second recording area.

42. The recording and reproducing apparatus according to claim 40, further comprising a watermark adder operable to add a watermark to the contents data in the first recording area, wherein said watermark adder is further operable to generate watermarks based on data recorded in the second recording area and reproduced with an optical head, to add the watermarks to the contents data and to record the added data to the first recording area.

43. The recording and reproducing apparatus according to claim 40, further comprising:

a frequency converter operable to convert reproduced signals from the first recording area from time axis signals to frequency axis signals to provide first conversion signals;

a mixer operable to add or superposes the first conversion signals to signals reproduced from the second recording area to provide mixed signals; and a reverse frequency converter operable to convert the mixed signals from frequency axis signals to time axis signals to provide second conversion signals.

44. A recording apparatus for recording contents to an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from said recording apparatus, said recording apparatus comprising:

a cipher device operable to cipher the contents based on data including information inherent to a disk; and a recording section operable to record the contents ciphered by said cipher device in the first recording area in the optical disk, wherein the control data includes an identifier indicating whether the second recording area further includes a third section for recording data to be inhibited from being outputted from said recording apparatus, and wherein the information inherent to the disk is recorded in the third section.

45. The recording device according to claim 44, further comprising a watermark decoder operable to decode watermark information generated based on a disk identification from input signals, wherein when decoded data obtained by said watermark decoder has a predetermined value, said recording section ciphers the input signals based on the disk identification and records the ciphered signals to the optical disk.

46. The recording device according to claim 44, wherein said watermark decoder is further operable to convert input signals from time space to frequency space and to decode watermarks by using the signals in the frequency space.

47. A reproducing apparatus for reproducing contents from an optical disk having at least a recording layer for recording information, the optical disk comprising a first recording area for recording ciphered contents data and data for recording and reproducing the ciphered contents data, and a second recording area for recording secondary data related to the contents data, the second recording area comprising a first section for recording control data and a second section for recording data not to be inhibited from being outputted from said reproducing apparatus, the secondary data including a disk identification inherent to each optical disk, said reproducing apparatus comprising:

an optical head operable to reproduce information from the optical disk with an optical spot;

a first reproducing section operable to reproduce data with said optical head from the first recording area; and a second reproducing section operable to reproduce data with said optical head from the second recording area, wherein the control data includes an identifier indicating whether the second recording area further includes a third section for recording data to be inhibited from being outputted from said reproducing apparatus, and wherein said first reproducing section is operable to decode the ciphered contents data by using the disk identification reproduced by said second reproducing section.

48. The apparatus according to claim 47, wherein said second reproducing section comprises a phase-encode return-to-zero decoder.

49. The apparatus according to claim 47, wherein said second reproducing section comprises a device operable to suppress high frequency components with a cut-off frequency of 1.2 MHz.

50. A reproducing apparatus for reproducing contents from an optical disk having at least a recording layer for recording information, the optical disk comprising a first recording area for recording contents data and data for recording and reproducing the contents data, and a second recording area for recording secondary data related to the contents data, the second recording area comprising a first section for recording control data and a second section for recording data not to be inhibited from being outputted from said reproducing apparatus, the secondary data including a disk identification inherent to the optical disk, said reproducing apparatus comprising:

an optical head operable to reproduce information from the optical disk with an optical spot;

a first reproducing section operable to reproduce data with said optical head from the first recording area; and a second reproducing section operable to reproduce data with said optical head from the second recording area, wherein the control data includes an identifier indicating whether the second recording area further includes a third section for recording data to be inhibited from being outputted from said reproducing apparatus.

51. The apparatus according to claim 50, wherein said second reproducing section comprises a device operable to suppress high frequency components with a cut-off frequency of 1.2 MHz and to decode the secondary data after suppressing high frequency components.

52. The apparatus according to claim 50, wherein said device is operable to perform phase-encode return-to-zero decoding for the secondary data.

* * * * *